(12) United States Patent
Takano et al.

(10) Patent No.: US 9,013,802 B2
(45) Date of Patent: Apr. 21, 2015

(54) ZOOM LENS, IMAGING DEVICE AND INFORMATION DEVICE

(71) Applicants: Yohei Takano, Yokohama (JP); Hiromichi Atsuumi, Yokohama (JP)

(72) Inventors: Yohei Takano, Yokohama (JP); Hiromichi Atsuumi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/200,639

(22) Filed: Mar. 7, 2014

(65) Prior Publication Data

US 2014/0185145 A1 Jul. 3, 2014

Related U.S. Application Data

(62) Division of application No. 13/482,401, filed on May 29, 2012, now Pat. No. 8,705,180.

(30) Foreign Application Priority Data

| May 30, 2011 | (JP) | 2011-121122 |
| Jul. 5, 2011 | (JP) | 2011-149582 |
| Aug. 24, 2011 | (JP) | 2011-182948 |

(51) Int. Cl.
*G02B 15/14* (2006.01)
*G02B 15/16* (2006.01)
(Continued)

(52) U.S. Cl.
CPC ............... *G02B 15/14* (2013.01); *G02B 15/16* (2013.01); *G02B 15/17* (2013.01); *G02B 27/0062* (2013.01); *G02B 15/173* (2013.01)

(58) Field of Classification Search
CPC .................................. G02B 15/14; G02B 15/16
USPC .................................................... 359/676, 683
See application file for complete search history.

(56) References Cited

U.S. PATENT DOCUMENTS

| 5,136,431 A | 8/1992 | Terasawa et al. |
| 6,147,810 A | 11/2000 | Misaka |

(Continued)

FOREIGN PATENT DOCUMENTS

| EP | 2 287 650 A1 | 2/2011 |
| JP | 3-228008 | 10/1991 |

(Continued)

OTHER PUBLICATIONS

Gross H Ed- Gross H, "Handbook of Optical Systems, Chromatic Aberrations," Handbook of Optical Systems, Aberration Theory and Correction of Optical Systems, XP002619942, pp. 268-289, Jan. 1, 2007.

(Continued)

*Primary Examiner* — William Choi
(74) *Attorney, Agent, or Firm* — Oblon, McClelland, Maier & Neustadt, L.L.P.

(57) ABSTRACT

A zoom lens includes, in order from an object side in an optical axis a first lens group having a positive refractive power, a second lens group having a negative refractive power; a third lens group having a negative refractive power, a fourth lens group having a positive refractive power, a fifth lens group having a positive refractive power, and an aperture stop arranged between the third lens group and the fourth lens group, an interval between the first lens group and the second lens group being increased, an interval between the second lens group and the third lens group being varied, an interval between the third lens group and the fourth lens group being decreased, and an interval between the fourth lens group and the fifth lens group being decreased when changing a magnification from a wide-angle end to a telephoto end.

7 Claims, 27 Drawing Sheets

(51) Int. Cl.
*G02B 15/17* (2006.01)
*G02B 27/00* (2006.01)
*G02B 15/173* (2006.01)

(56) References Cited

U.S. PATENT DOCUMENTS

| | | |
|---|---|---|
| 6,236,516 B1 | 5/2001 | Misaka |
| 7,933,074 B2 | 4/2011 | Takano et al. |
| 8,179,610 B2 | 5/2012 | Takano et al. |
| 8,223,224 B2 | 7/2012 | Sakamoto |
| 8,638,503 B2 | 1/2014 | Takano et al. |
| 8,649,108 B2 | 2/2014 | Atsuumi et al. |
| 2009/0073572 A1 | 3/2009 | Atsuumi |
| 2009/0122418 A1 | 5/2009 | Atsuumi et al. |
| 2009/0135500 A1 | 5/2009 | Sudoh et al. |
| 2009/0147375 A1 | 6/2009 | Sudoh et al. |
| 2010/0091173 A1 | 4/2010 | Miyazaki et al. |
| 2010/0123956 A1 | 5/2010 | Wada |
| 2010/0195207 A1 | 8/2010 | Uchida et al. |
| 2010/0238565 A1 | 9/2010 | Takano et al. |
| 2011/0109978 A1 | 5/2011 | Yamada et al. |
| 2012/0008216 A1 | 1/2012 | Takano et al. |
| 2012/0236419 A1* | 9/2012 | Atsuumi et al. ............... 359/683 |
| 2013/0135751 A1 | 5/2013 | Atsuumi et al. |
| 2013/0222922 A1 | 8/2013 | Atsuumi et al. |

FOREIGN PATENT DOCUMENTS

| | | |
|---|---|---|
| JP | 10-48518 | 2/1998 |
| JP | 11-305128 | 11/1999 |
| JP | 3397686 | 2/2003 |
| JP | 2009-251113 | 10/2009 |
| JP | 4401451 | 11/2009 |
| JP | 2010-175954 | 8/2010 |

OTHER PUBLICATIONS

Robert E. Fischer et al., "Removing the Mystique of Glass Selection," Proceedings of SPIE, vol. 5514, XP055046912, pp. 134-146, Oct. 22, 2004.

Extended Search Report issued in European Patent Application No. 121700043.9 on Feb. 22, 2013.

Partial European Search Report issued in Patent Application No. 12170043.9 on Nov. 13, 2012.

* cited by examiner

ZOOM LENS, IMAGING DEVICE AND INFORMATION DEVICE

CROSS-REFERENCE TO RELATED APPLICATIONS

The present application is a continuation of U.S. application Ser. No. 13/482,401 filed May 29, 2012, which is based on and claims priority from Japanese Patent Application No. 2011-121122 filed May 30, 2011, Japanese Patent Application No. 2011-149582 filed Jul. 5, 2011, and Japanese Patent Application No. 2011-182948 filed Aug. 24, 2011, the disclosures of each of which are hereby incorporated by reference in their entirety.

BACKGROUND

1. Field of the Invention

The present invention relates to a zoom lens for use in a video camera, electronic still camera or the like using an imaging element, an imaging device and information device having such a zoom lens.

The zoom lens of this invention can be used as an imaging zoom lens in an imaging device such as a silver salt camera, digital still camera, video camera, or digital video camera. The information device of this invention can be used as a digital still camera, portable digital assistant or the like.

2. Description of the Related Art

In recent years, a zoom lens has generally been used in photographing optical systems for use in digital still cameras or the like. A zoom lens including an approximate 50 mm field angle in a focal length range in 35 mm conversion is especially known.

With respect to these zoom lenses, users strongly request downsizing, wide angle, and high-speed auto focusing (hereinafter, referred to as AF).

Various positive lead type zoom lenses including in order from an object side to an image side a first lens group having a positive refractive power, a second lens group having a negative refractive power and a subsequent group are conventionally known (refer to Patent Document 1: Japanese Patent Application Publication No. H03-228008, Patent Document 2: Japanese Patent Publication No. 3716418, Patent Document 3: Japanese Patent Publication No. 3397686, Patent Document 4: Japanese Patent Publication No. 4401451 and Patent Document 5: Japanese Patent Application Publication No. 2010-175954). Such a zoom lens can easily increase a magnification ratio and downsize an entire length with a positive lead type lens.

Each of the zoom lenses described in Patent Documents 1-5 includes an inner focus type lens. The zoom lens described in Patent Document 1 performs focusing by the movement of the second lens group. Each of the zoom lenses described in Patent Documents 2-5 performs focusing by the movement of the third lens group.

In the zoom lens described in Patent Document 1, which performs focusing by the movement of the second lens group, the sizes of a motor and an actuator are likely to be increased, and the maximum diameter of a lens barrel is also likely to be increased because of a large weight of the second lens group.

Such a zoom lens has a problem in high-speed AF and quiescence in animation photographing because the second lens group has a large weight.

Each of the zoom lenses described in Patent Documents 2-5 performs focusing by the third lens group having a negative refractive power.

However, it is difficult to significantly reduce a weight of the focusing group of the zoom lens in each of Patent Documents 2-4. In the zoom lens described in Patent Document 5, the third lens group for focusing is constituted by one negative lens, so that the weight of the focusing group is reduced; thus, high-speed AF and a small diameter lens barrel can be accomplished. However, it is considered that the performance of the third lens group should be further improved and the zoom lens should be further downsized.

In recent years in which a zoom lens has mainly been used, high-speed AF is required as described above. It is necessary for a zoom lens to reduce an entire length of lenses (a distance from a lens surface on the most object side to an image side) when using a zoom lens in order to downsize the zoom lens.

It is also necessary to downsize a focusing lens for increasing an AF speed.

Moreover, considering the application of a zoom lens to a high-end digital camera, it is necessary to have resolution corresponding to an imaging element having at least 10 million pixels over the entire zooming area.

A zoom lens which is suitable for a high magnification ratio includes in order from the object side to the image side a first lens group having a positive refractive power, a second lens group having a negative refractive power, a third lens group having a negative refractive power, a fourth lens group having a positive refractive power and a fifth lens group having a positive refractive power.

Such a conventional zoom lens including a five-group constitution of positive, negative, negative, positive, positive is described in Patent Document 6 (Japanese Patent Application Publication H10-48518) and Patent Document 7 (Japanese Patent Application Publication 2000-28923).

The zoom lens described in Patent Document 6 includes a five-group constitution of positive, negative, negative, positive, positive in a specific example, and performs focusing by moving a third lens group as a focusing group. However, the third lens group is large and heavy because the third lens group is a cemented lens made of negative and positive lenses. For this reason, a load for moving the focusing group is increased and a size of a motor or the like for driving the focusing group and a time for focusing are also increased.

The zoom lens described in Patent Document 7 includes a five-group constitution of positive, negative, negative, positive, positive in Embodiment 4, and performs focusing by moving the third lens group as a focusing group. However, the third lens group is large and heavy because the third lens group includes three lenses of negative, positive and negative. For this reason, a load for moving the focusing group is increased and a size of a motor or the like for driving the focusing group and a time for focusing are also increased similar to Patent Document 6.

SUMMARY

The present invention has been made in view of the above circumstances. An object of the present invention is to provide a zoom lens which is suitable as a zoom lens for a compact and high performance digital camera, and can accomplish high-speed AF, a downsized driving system for AF and resolution corresponding to an imaging element having over 10 million pixels, an imaging device and an information device using such a zoom lens.

In order to achieve the above object, one embodiment of the present invention provides a zoom lens comprising, in order from an object side in an optical axis: a first lens group having a positive refractive power; a second lens group having a negative refractive power; a third lens group having a negative refractive power; a fourth lens group having a positive refractive power; a fifth lens group having a positive refractive power; and an aperture stop arranged between the third lens group and the fourth lens group, an interval between the first lens group and the second lens group being increased, an interval between the second lens group and the third lens group being increased, an interval between the third lens group and the fourth lens group being decreased, and an interval between the fourth lens group and the fifth lens group being decreased when changing a magnification from a wide-angle end to a telephoto end, the third lens group including one negative lens made of a negative meniscus lens having a concave surface on the object side, and focusing being performed by moving the third lens group in an optical axis direction, wherein a curvature radius of an object side surface of the third lens group, R31, a curvature radius of an image side surface of the third lens group, R32, a focal length of the third lens group, F3, a synthesis focal length of the second and third lens groups at the wide-angle end, F23w, a synthesis focal length of the second and third lens groups at the telephoto end, F23t, a focal length at the wide-angle end, Fw, a focal length at the telephoto end, Ft, and √(Fw×Ft), Fm satisfy the following conditions (1), (2), (3).

$$1.0 < (R31-R32)/|F23w| < 10.0 \quad (1)$$

$$1.0 < (R31-R32)/|F23t| < 10.0 \quad (2)$$

$$1.4 < |F3|/Fm < 2.5 \quad (3)$$

One embodiment of the present invention also provides a zoom lens comprising, in order from an object side to an image side in an optical axis: a first lens group having a positive refractive power; a second lens group having a negative refractive power; a third lens group having a negative refractive power; a fourth lens group having a positive refractive power; a fifth lens group having a positive refractive power; and an aperture stop arranged between the third lens group and the fourth lens group, an interval between the first lens group and the second lens group being increased, an interval between the second lens group and the third lens group being varied, an interval between the third lens group and the fourth lens group being decreased, and an interval between the fourth lens group and the fifth lens group being decreased when changing a magnification from a wide-angle end to a telephoto end, and focusing being performed by moving the third lens group, wherein a focal length of the third lens group, f3, a focal length of an entire system at the wide-angle end, fw, a focal length of the entire system at the telephoto end, ft satisfy the following condition (7).

$$1.4 < |f3/\sqrt{(fw \times ft)}| < 3 \quad (7)$$

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

DESCRIPTION OF THE PREFERRED EMBODIMENTS

Figure 1:
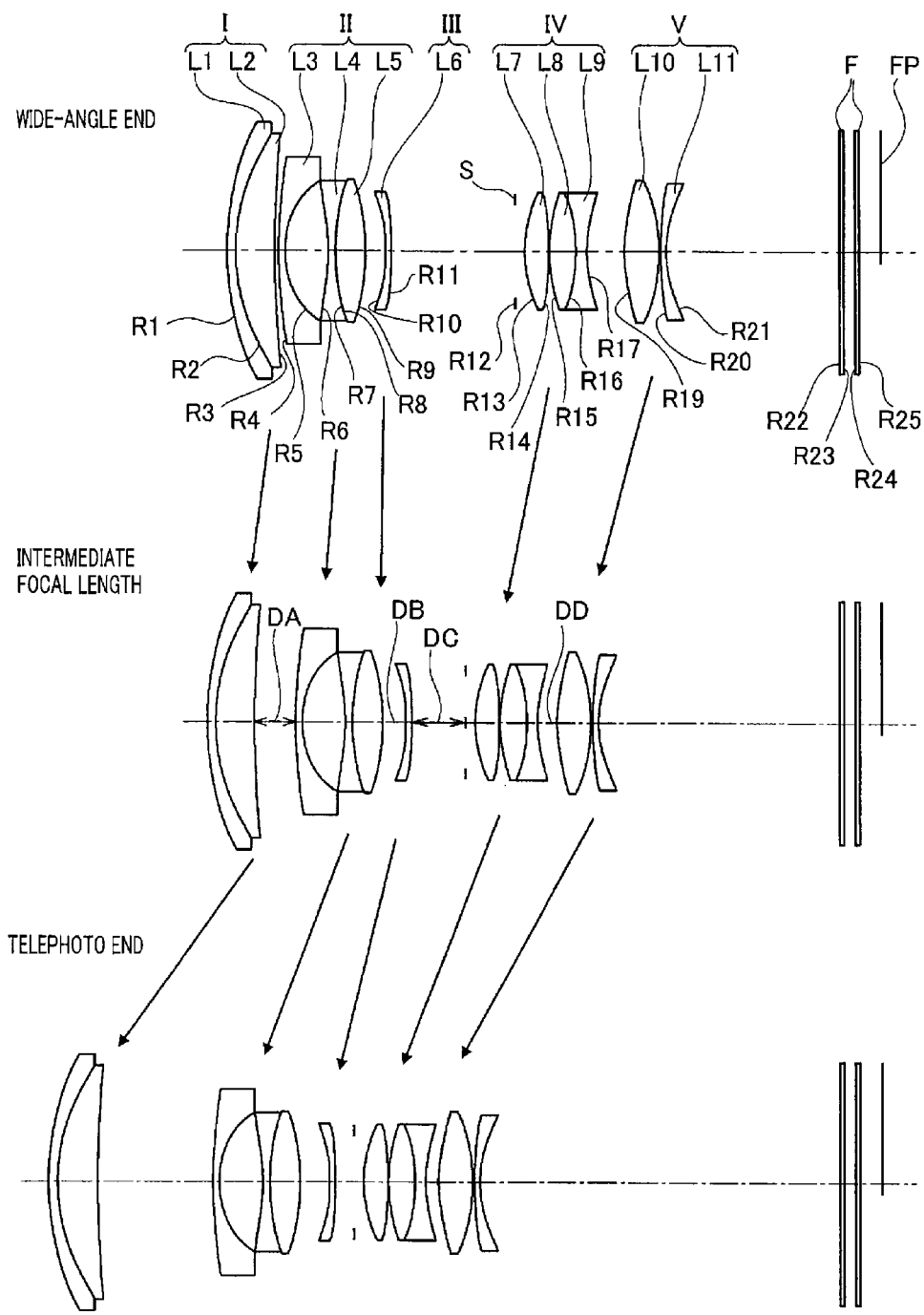
FIG. 1 is a view illustrating a zoom lens in Embodiment 1.

Embodiments of the present invention will be hereinafter described.

A zoom lens according to one embodiment of the present invention includes in order from an object side to an image side a first lens group having a positive refractive power, a second lens group having a negative refractive power, a third lens group having a negative refractive power, a fourth lens group having a positive refractive power, a fifth lens group having a positive refractive power and an aperture stop between the fourth and fifth lens groups. In such a zoom lens, the interval between the first and second lens groups is increased, the interval between the second and third lens groups is increased, the interval between the third and fourth lens groups is decreased and the interval between the fourth and fifth lens groups is decreased when changing a magnification from the wide-angle end to the telephoto end. The zoom lens has the following features.

More specifically, the third lens group is constituted by one negative lens, and this negative lens is a negative meniscus lens having a concave surface on the object side. The focusing is performed by the movement of the third lens group in the optical axis direction.

A curvature radius of an object side surface of the third lens group, R31, a curvature radius of an image side surface of the third lens group, R32, a focal length of the third lens group, F3, a synthesis focal length of the second and third lens groups at the wide-angle end, F23w, a synthesis focal length of the second and third lens groups at the telephoto end, F23t, and a focal length at the wide-angle end, Fw, a focal length at the telephoto end, Ft, and $\sqrt{(Fw \times Ft)}$, Fm satisfy the following conditions (1), (2), (3).

$$1.0 < (R31-R32)/|F23w| < 10.0 \quad (1)$$

$$1.0 < (R31-R32)/|F23t| < 10.0 \quad (2)$$

$$1.4 < |F3|/Fm < 2.5 \quad (3)$$

It is preferable for a maximum image height, Y' and the focal length at the wide-angle end, Fw in the zoom lens to satisfy the following condition (5).

$$0.75 < Y'/Fw \quad (5)$$

It is preferable for the focal length at the telephoto end, Ft and the focal length at the wide-angle end, Fw in the zoom lens to satisfy the following condition (6).

$$2.8 < Ft/Fw \quad (6)$$

It is preferable for an Abbe's number of a material of one negative lens constituting the third lens group, vd in the zoom lens to satisfy the following condition (4).

$$vd > 50 \quad (4)$$

A material outside the range of the condition (4) can be used as a material for the above one negative lens.

An information device of one embodiment of the present invention includes the above-described zoom lens as an optical system for photographing. A silver salt camera, video camera or the like can be used as such an information device.

The information device includes a photographing function in which an object image by a zoom lens is formed on a light-receiving surface of the imaging element, and can be used as a digital still camera, video camera or the like.

The information device can be constituted as a portable digital assistant.

The zoom lens includes an inner focus type which performs focusing by the movement of the third lens group. The third lens group as the focusing group is constituted by one negative lens. The zoom lens is constituted to satisfy the conditions (1)-(3).

The focusing group is light because it includes one lens, so that high speed AF, a reduced lens barrel diameter and silent focusing can be accomplished.

However, it is necessary to preferably control eccentric error sensitivity of the third lens group because the third lens group is a focusing lens group which frequently moves for the focusing operation. It is disadvantage in the downsizing of the third lens group if the power of the third lens group is reduced for controlling the eccentric error sensitivity.

Each of the conditions (1), (2) is a condition which defines an appropriate range of a power balance of each surface of the one negative lens constituting the third lens group.

If the parameters exceed the ranges of the conditions (1), (2), load to each surface is increased, aberrations are generated, and the eccentric error sensitivity is also increased.

The numerators of the parameters of the conditions (1), (2) are positive values, respectively. Therefore, the one negative lens constituting the third lens group is a negative meniscus lens having a concave surface on the object side.

The condition (3) is a condition which defines an appropriate range of a focal length of the third lens group, F3. Fm of the denominator of the parameter is $\sqrt{(Fw \times Ft)}$, and the geometric average of the focal lengths at the wide-angle end and the telephoto end is given.

The decrease in the parameter, |F3|/Fm means the decrease in the focal length of the third lens group and the increase in the negative power of the third lens group. This is advantageous in downsizing, but if the parameter exceeds the lower limit value of the condition (3), the eccentric error sensitivity of the third lens group is increased, which is a disadvantage in terms of processing performance.

If the parameter exceeds the upper limit value of the condition (3), the negative power of the third lens group is reduced. This is advantageous in terms of processing performance, but is disadvantageous in downsizing.

By simultaneously satisfying the conditions (1), (2), (3), a focusing group, which is suitable for downsizing, has small eccentric error sensitivity and controls generation of aberrations, can be accomplished by one lens.

It is more preferable for each of the parameters of the conditions (1)-(3) to satisfy the following conditions (1A), (2A), (3A).

$$1.5 < (R31-R32)/|F23w| < 9.5 \quad (1A)$$

$$1.5 < (R31-R32)/|F23t| < 9.5 \quad (2A)$$

$$1.5 < |F3|/Fm < 2.3 \quad (3A)$$

The zoom lens of this embodiment includes the above-described five-group constitution. The first to third lens groups constitute a front group and the fourth and fifth lens groups constitute a back group. The back group is made up of two lens groups, so that the load of the front group for changing a magnification is reduced, and the design freedom can be improved. Therefore, it is advantageous in terms of aberration correction and a processing performance.

When changing a magnification, all of the lens groups move to contribute to the change in a magnification, so that the load for changing a magnification is dispersed to each group to be reduced. This is advantageous in terms of aberration correction and a processing performance. It becomes possible to effectively reduce the movement amount of the first lens group when changing a magnification. Accordingly, it is also advantageous in terms of downsizing.

The condition (5) is a condition which controls a field angle and can achieve a half field angle of 36.8° or more at the wide-angle end.

It is more preferable for the parameter of the condition (5) to satisfy the following condition (5A).

$$0.87 < Y'/Fw \quad (5A)$$

The condition (6) is a condition which controls a zoom ratio and can achieve a magnification ratio of 2.8 times or more.

It is more preferable for the zoom ratio to satisfy the following condition (6A).

$$2.8 < Ft/Fw < 5 \quad (6A)$$

By constituting the third lens group with a material which satisfies the condition (4), a higher performance can be achieved.

More specifically, the generation of various chromatic aberrations can be controlled by using a relatively low dispersion glass for the lens constituting the third lens group because the third lens group is constituted by one lens. With this constitution, the aberrations can be further effectively corrected by reducing the load of other lens groups.

The mechanism can be simplified if the opening diameter of the aperture stop is set constant regardless of a magnification, but the change in F number can be decreased by increasing the opening diameter of the telephoto end compared to the opening diameter of the wide-angle end.

The diameter of the aperture stop can be reduced when the decrease in the light volume which reaches an image surface is required. However, it is preferable to reduce the light volume by inserting an ND filter or the like without significantly changing the diameter of the aperture stop because the decrease in resolution due to a diffraction phenomenon can be prevented.

Eight embodiments of the zoom lenses are sequentially described, referring to FIGS. 1, 5, 9, 13, 17, 21, 25, 29. These embodiments correspond to the after-described Embodiments 1-8.

The same reference numbers are used for respective figures in order to avoid complication.

Referring to FIGS. 1, 5, 9, 13, 17, 21, 25, 29, the left side is an object side and the right side is an image surface side.

The zoom lens includes in order from the object side in the optical axis a first lens group I having a positive refractive power, a second lens group II having a negative refractive power, a third lens group III having a negative refractive power, a fourth lens group IV having a positive refractive power, a fifth lens group V having a positive refractive power and an aperture stop S between the third lens group III and the fourth lens group IV.

In each figure, the top view illustrates the lens arrangement at the wide-angle end, the middle view illustrates the lens arrangement at the intermediate focal length and the bottom view illustrates the lens arrangement at the telephoto end. The arrows illustrate movement of respective lens groups when changing a magnification from the wide-angle end to the telephoto end.

As is apparent from each figure, in the zoom lens of the present invention, all of the lens groups move when changing a magnification from the wide-angle end to the telephoto end.

Namely, the interval between the first lens group I and the second lens group II is increased, the interval between the second lens group II and the third lens group III is increased, the interval between the third lens group III and the fourth lens group IV is decreased, and the interval between the fourth lens group IV and the fifth lens group V is decreased. The aperture stop S moves together with the fourth lens group IV when changing a magnification.

The third lens group III is constituted by one negative lens. This negative lens is a negative meniscus lens having a concave surface on the object side. The focusing is performed by the movement of the third lens group III in the optical axis direction.

Reference number F on the right side of the figure illustrates two transparent parallel plates.

In a camera using an imaging element such as a CCD or CMOS, for example, a digital still camera, a low pass filter, infrared cut glass or the like is provided close to the light-receiving surface of the imaging element. The light-receiving surface of the imaging element is protected by a cover glass.

The transparent parallel plates are various filters such as a low pass filter, and are plates virtually substituted by two transparent parallel plates optically equivalent to cover glasses.

The constitution of each lens group in the zoom lens illustrating an embodiment in FIG. 1 is as follows.

The first lens group I is a cemented lens including in order from the object side a negative meniscus lens having a convex surface on the object side and a positive meniscus lens having a convex surface on the object side.

The second lens group II includes in order from the object side a negative meniscus lens having a convex surface on the object side, a biconcave lens having an aspheric surface on both surfaces, and a biconvex lens.

The third lens group III is one negative meniscus lens having a strong concave surface on the object side.

The fourth lens group IV includes in order from the object side a biconvex lens having an aspheric surface on both surfaces and a strong convex surface on the object side and a cemented lens of a biconvex lens and a biconcave lens.

The fifth lens group V includes in order from the object side a biconvex lens having an aspheric surface on both surfaces and a negative meniscus lens having a convex surface on the object side.

Figure 5:
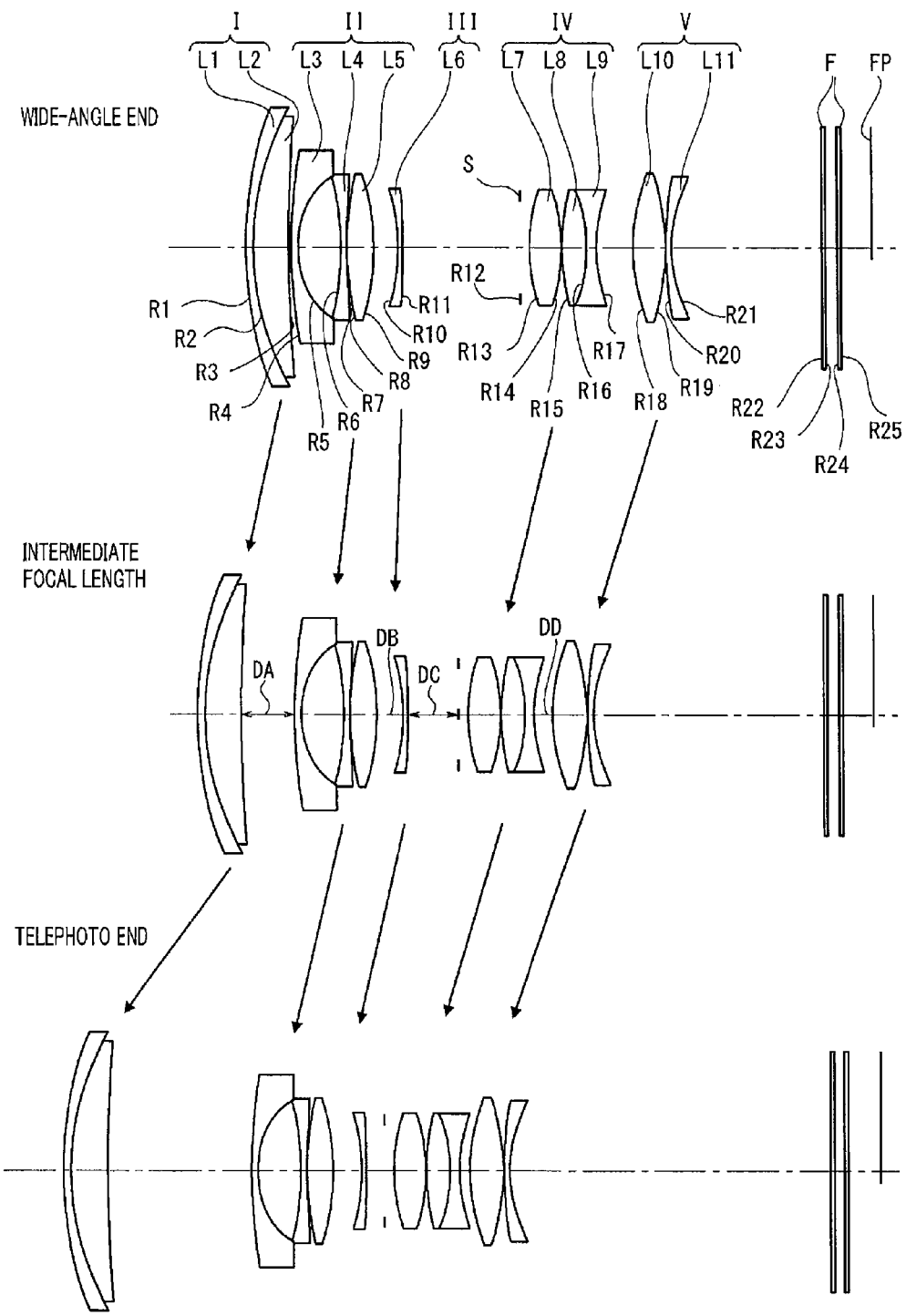
FIG. 5 is a view illustrating a zoom lens in Embodiment 2.

The constitution of each lens group in the zoom lens illustrating an embodiment in FIG. 5 is as follows.

The first lens group I is a cemented lens including in order from the object side a negative meniscus lens having a convex surface on the object side and a positive meniscus lens having a convex surface on the object side.

The second lens group II includes in order from the object side a negative meniscus lens having a convex surface on the object side, a biconcave lens having an aspheric surface on both surfaces and a biconvex lens.

The third lens group III includes one negative meniscus lens having a strong concave surface on the object side.

The fourth lens group IV includes in order from the object side a biconvex lens having an aspheric surface on both surfaces and a strong convex surface on the object side and a cemented lens having a biconvex lens and a biconcave lens.

The fifth lens group V includes a biconvex lens having an aspheric surface on both surfaces and a negative meniscus lens having a convex surface on the object side.

Figure 9:
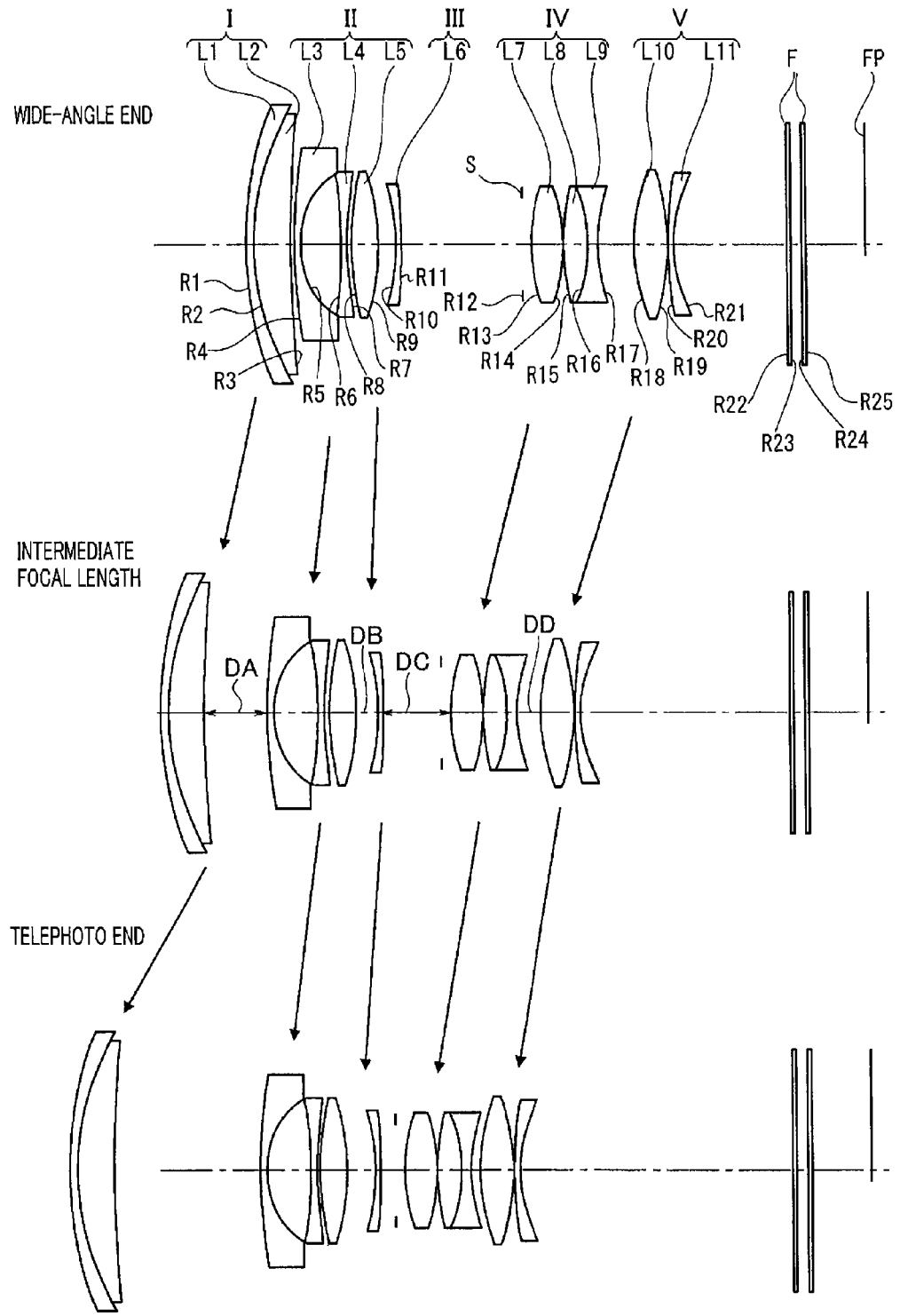
FIG. 9 is a view illustrating a zoom lens in Embodiment 3.

The constitution of each lens group in the zoom lens illustrating an embodiment in FIG. 9 is as follows.

The first lens group I is a cemented lens including in order from the object side a negative meniscus lens having a convex surface on the object side and a positive meniscus lens having a convex surface on the object side.

The second lens group II includes in order from the object side a negative meniscus lens having a convex surface on the object side, a biconcave lens having an aspheric surface on both surfaces and a biconvex lens.

The third lens group III includes one negative meniscus lens having a strong concave surface on the object side.

The fourth lens group IV includes in order from the object side a biconvex lens having an aspheric surface on both surfaces and a strong convex surface on the object side and a cemented lens having a biconvex lens and a biconcave lens.

The fifth lens group V includes in order from the object side a biconvex lens having an aspheric surface on both surfaces and a negative meniscus lens having a convex surface on the object side.

Figure 13:
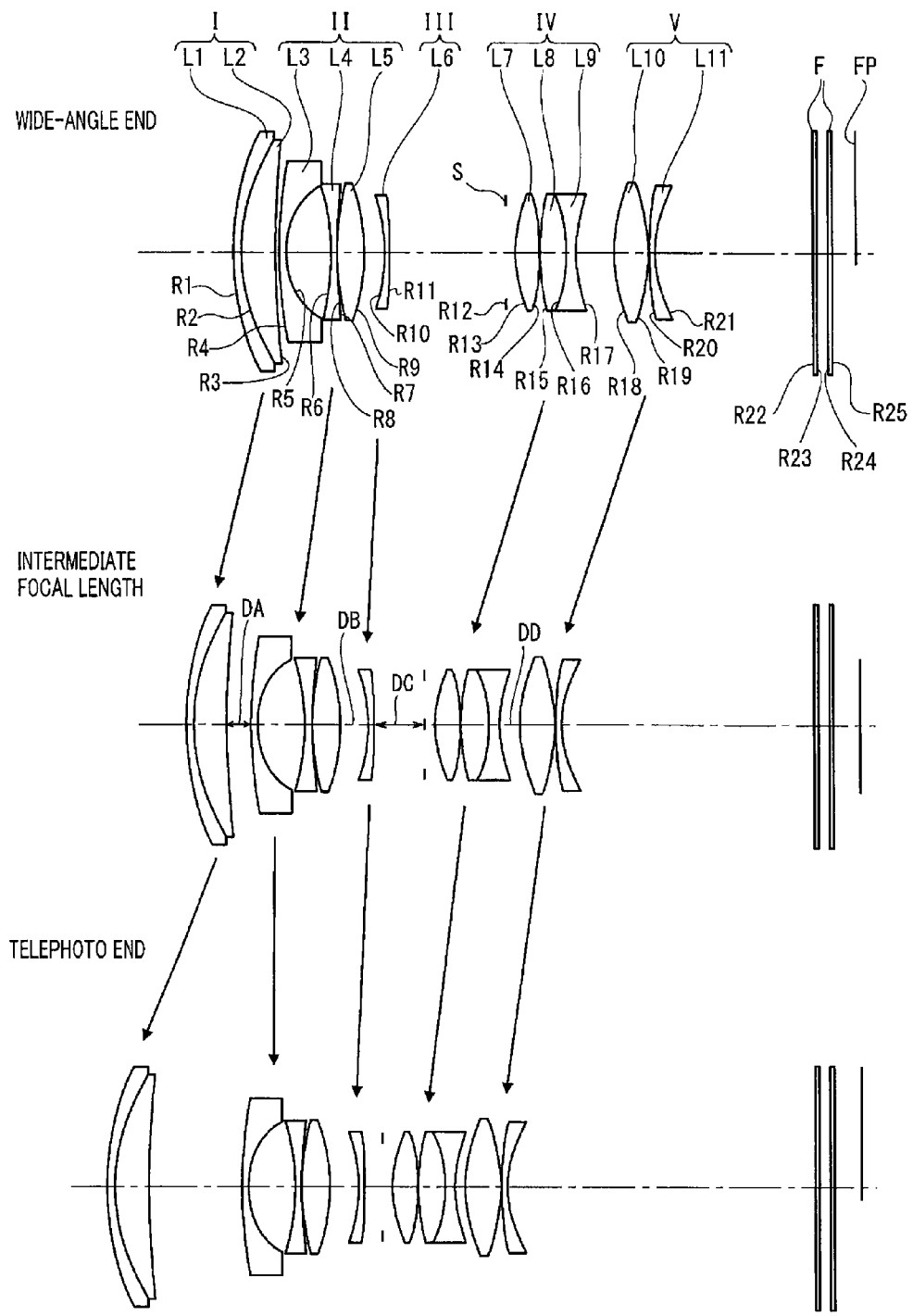
FIG. 13 is a view illustrating a zoom lens in Embodiment 4.

The constitution of each lens group in the zoom lens illustrating an embodiment in FIG. 13 is as follows.

The first lens group I is a cemented lens including in order from an object side a negative meniscus lens having a convex surface on the object side and a positive meniscus lens having a convex surface on the object side.

The second lens group II includes in order from the object side a negative meniscus lens having a convex surface on the object side, a biconcave lens having an aspheric surface on both surfaces and a biconvex lens.

The third lens group III includes one negative meniscus lens having a strong concave surface on the object side.

The fourth lens group IV includes in order from the object side a biconvex lens having an aspheric surface on both surfaces and a strong convex surface on the object side and a cemented lens of a biconvex lens and a biconcave lens.

The fifth lens group V includes in order from the object side a biconvex lens having an aspheric surface on both surfaces and a negative meniscus lens having a convex surface on the object side.

Figure 17:
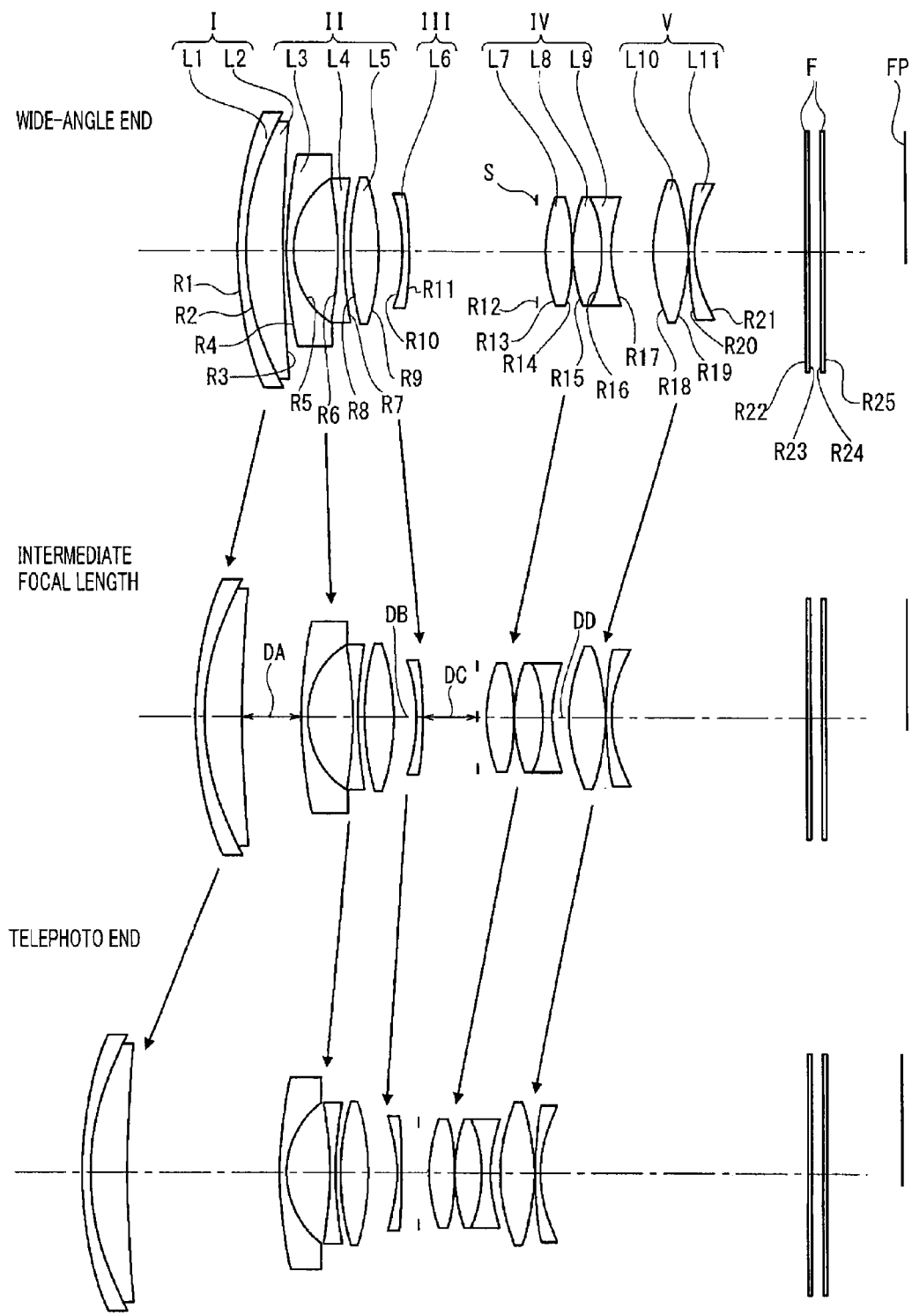
FIG. 17 is a view illustrating a zoom lens in Embodiment 5.

The constitution of each lens group in the zoom lens illustrating an embodiment in FIG. 17 is as follows.

The first lens group I is a cemented lens including in order from the object side a negative meniscus lens having a convex surface on the object side and a positive meniscus lens having a convex surface on the object side.

The second lens group II includes in order from the object side a negative meniscus lens having a convex surface on the object side, a biconcave lens having an aspheric surface on both surfaces and a biconvex lens.

The third lens group II includes one negative meniscus lens having a strong concave surface on the object side.

The fourth lens group IV includes in order from the object side a biconvex lens having an aspheric surface on both surfaces and a strong convex surface on the object side and a cemented lens of a biconvex lens and a biconcave lens.

The fifth lens group V includes in order from the object side a biconvex lens having an aspheric surface on both surfaces and a negative meniscus lens having a convex surface on the object side.

Figure 21:
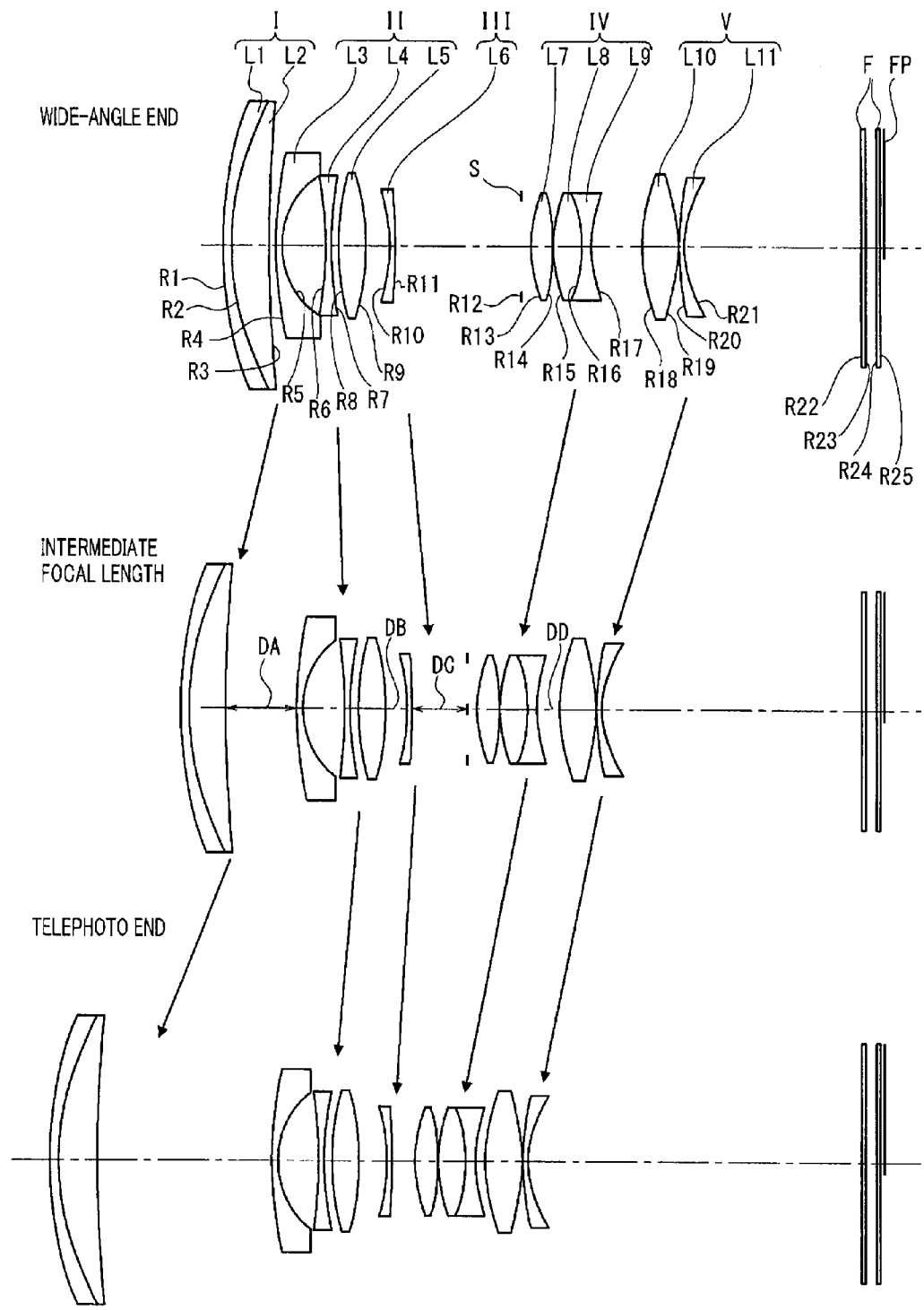
FIG. 21 is a view illustrating a zoom lens in Embodiment 6.

The constitution of each lens group in the zoom lens illustrating an embodiment in FIG. 21 is as follows.

The first lens group I is a cemented lens including in order from the object side a negative meniscus lens having a convex surface on the object side and a positive meniscus lens having a convex surface on the object side.

The second lens group II includes in order from the object side a negative meniscus lens having a convex surface on the object side, a biconcave lens having an aspheric surface on both surfaces and a biconvex lens.

The third lens group III includes one negative meniscus lens having a strong concave surface on the object side.

The fourth lens group IV includes in order from the object side a biconvex lens having an aspheric surface on both surfaces and a strong convex surface on the object side and a cemented lens of a biconvex lens and a biconcave lens.

The fifth lens group V includes in order from the object side a biconvex lens having an aspheric surface on both surfaces and a negative meniscus lens having a convex surface on the object side.

Figure 25:
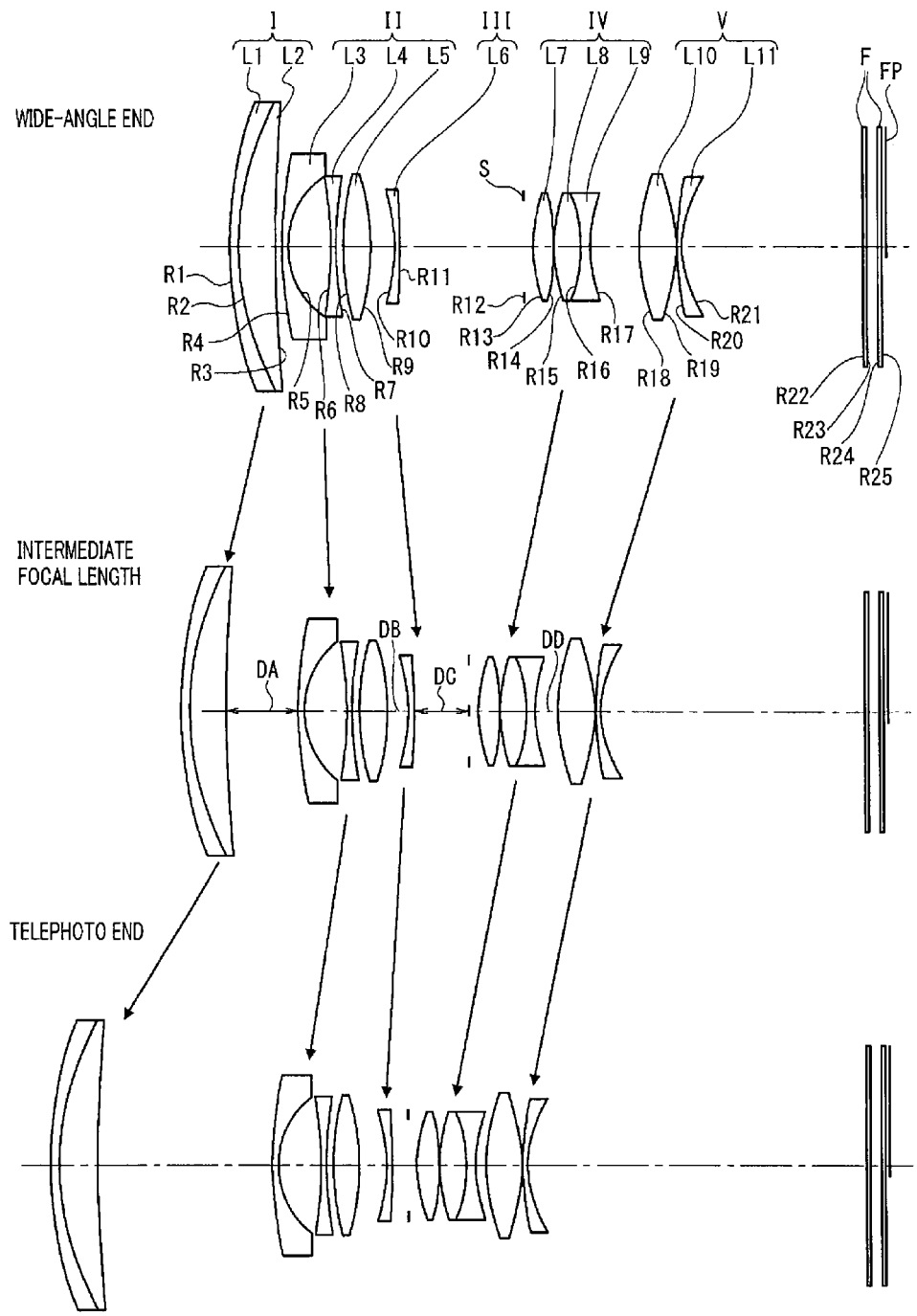
FIG. 25 is a view illustrating a zoom lens in Embodiment 7.

The constitution of each lens group in the zoom lens illustrating an embodiment in FIG. 25 is as follows.

The first lens group I is a cemented lens including in order from the object side a negative meniscus lens having a convex surface on the object side and a positive meniscus lens having a convex surface on the object side.

The second lens group II includes in order from the object side a negative meniscus lens having a convex surface on the object side, a biconcave lens having an aspheric surface on both surfaces and a biconvex lens.

The third lens group III includes one negative meniscus lens having a strong concave surface on the object side.

The fourth lens group IV includes in order from the object side a biconvex lens having an aspheric surface on both surfaces and a strong convex surface on the object side and a cemented lens of a biconvex lens and a biconcave lens.

The fifth lens group V includes in order from the object side a biconvex lens having an aspheric surface on both surfaces and a negative meniscus lens having a convex surface on the object side.

Figure 29:
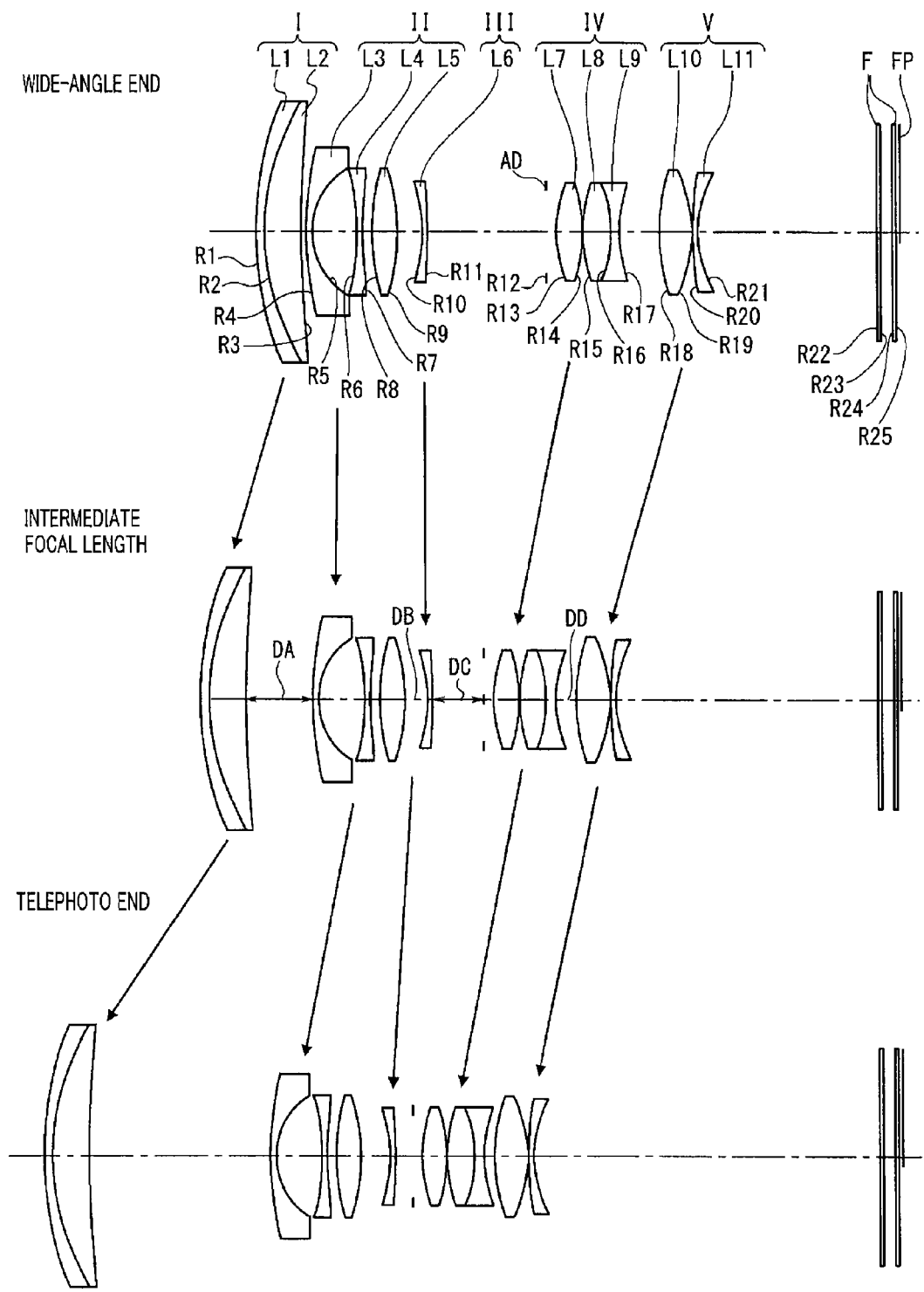
FIG. 29 is a view illustrating a zoom lens in Embodiment 8.

The constitution of each lens group in the zoom lens illustrating an embodiment in FIG. 29 is as follows.

The first lens group I is a cemented lens including in order from the object side a negative meniscus lens having a convex surface on the object side and a positive meniscus lens having a convex surface on the object side.

The second lens group II includes in order from an object side a negative meniscus lens having a convex surface on the object side, a biconcave lens having an aspheric surface on both surfaces and a biconvex lens.

The third lens group III includes one negative meniscus lens having a strong concave surface on the object side.

The fourth lens group IV includes in order from the object side a biconvex lens having an aspheric surface on both surfaces and a strong convex surface on the object side and a cemented lens of a biconvex lens and a biconcave lens.

The fifth lens group V includes in order from the object side a biconvex lens having an aspheric surface on both surfaces and a strong convex surface on the image side and a negative meniscus lens having a convex surface on the object side.

An embodiment of an information device will be described with reference to FIGS. 33A-34.

Figure 33A:
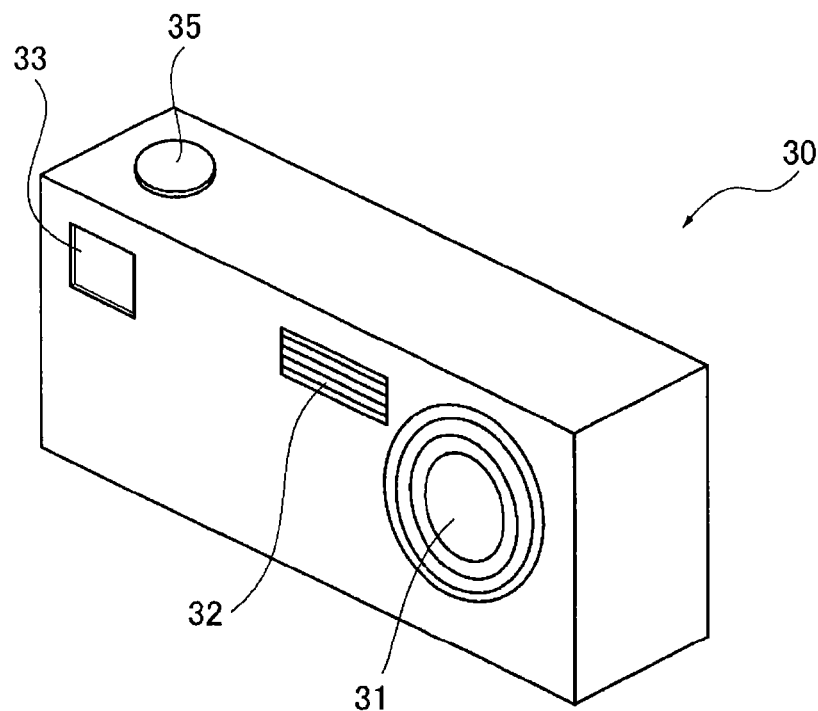
FIG. 33A, 33B, 33C are views each illustrating an embodiment of an information device.
Figure 33B:
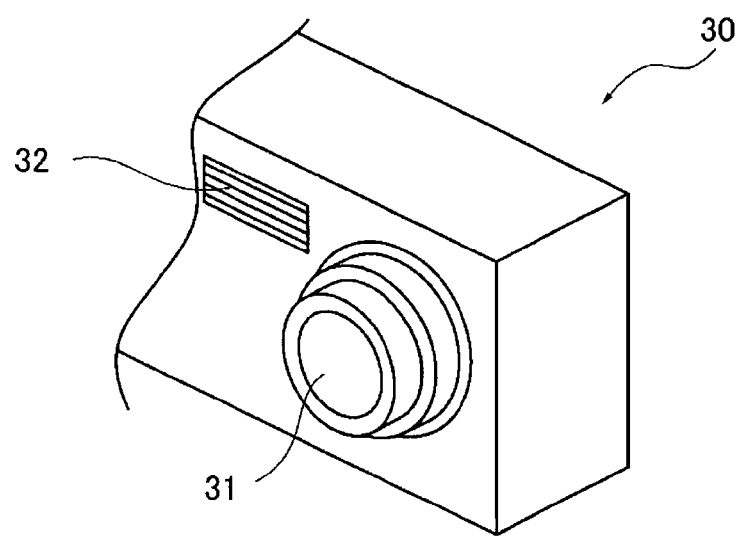
Figure 33C:
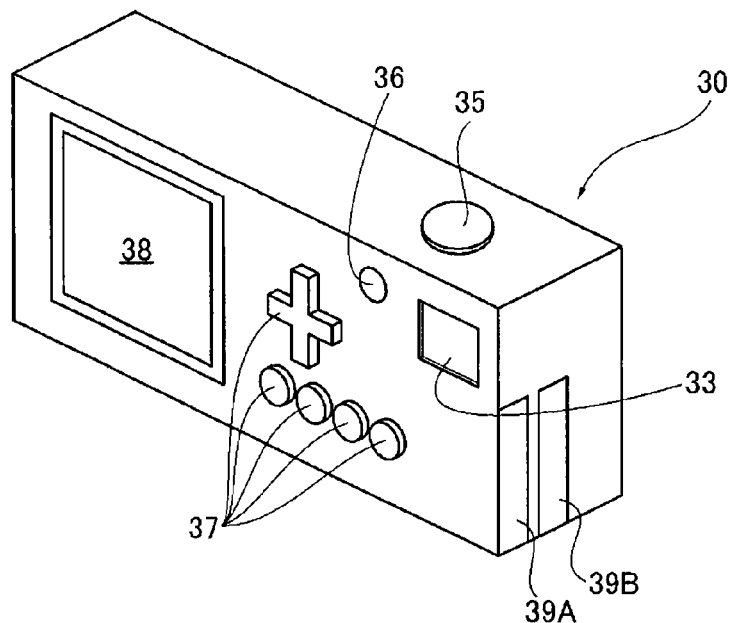
Figure 34:
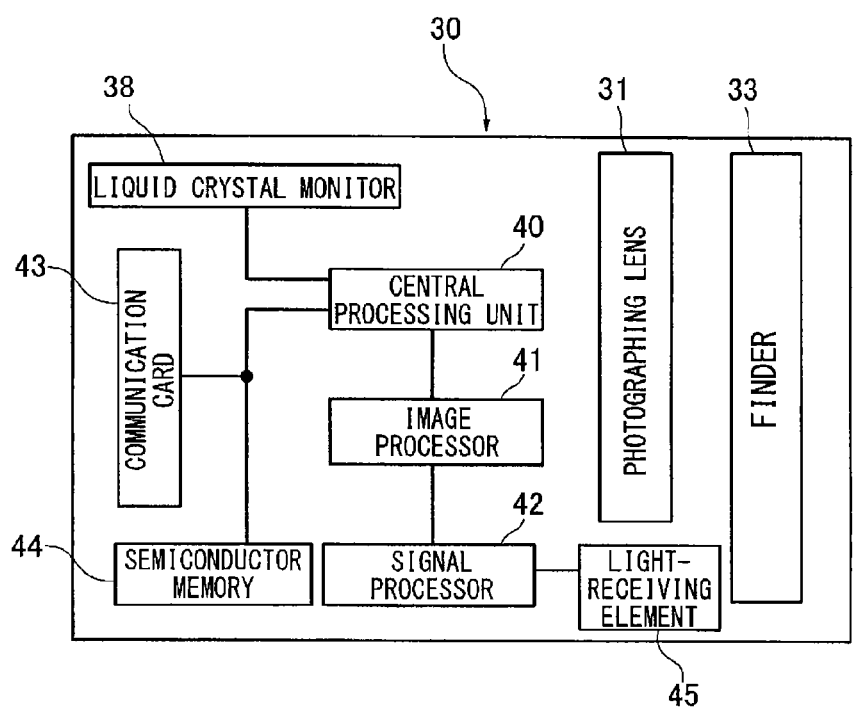
FIG. 34 is a view illustrating a system configuration of the device in FIGS. 33A-33C, 36.

FIGS. 33A-33C illustrate external appearances of a camera device (camera portion of information device), and FIG. 34 illustrates a system constitution of the information device.

As illustrated in FIG. 34, the information device 30 includes a photographing lens 31, a light-receiving element 45 (imaging element in which 5-10 million pixels are two-dimensionally arranged) and a finder 33. The information device 30 is configured to read an image of a photographing object formed by the photographing lens 31 with the light-receiving element 45.

The above-described imaging lens, particularly, an imaging lens described in each of the following embodiments 1-8 is used as the photographing lens 31.

The output from the light-receiving element 45 is processed by a signal processor 42 which is controlled by a central processing unit 40, and is converted into digital information. The digitalized image information is processed in an image processor 41 which is controlled by the central processing unit 40, and is recorded in a semiconductor memory 44.

A liquid crystal monitor 39 can display an image in photographing processed in the image processor 41, and can display an image recorded in the semiconductor memory 44. The image recorded in the semiconductor memory 44 can be sent outside with a communication card 43 or the like.

The image processor 41 includes a function which electrically corrects shading, a function which trims an image central portion, and the like.

The photographing lens 31 is in a collapsed state as illustrated in FIG. 33A when the information device is carried, and a lens barrel is extended as illustrated in FIG. 33B in response to a turning-on operation with a power source switch 36 by a user.

In this case, each group of the zoom lens inside the lens barrel is arranged such that an object distance is infinity. The focusing to a finite distance is performed by half-pressing a shutter button 35. The zooming is performed in response to the operation of a zooming adjuster 34, and the finder 33 changes a magnification according to the zooming operation.

The focusing operation is performed by moving the third lens group as described above.

The operation button 37 as illustrated in FIG. 33C is used when displaying an image recorded in the semiconductor memory 44 on the liquid crystal monitor 38 and sending the image outside by using a communication card or the like. The semiconductor memory, the communication card or the like is used by inserting in a dedicated or generalized socket 39A, 39B.

It is not always necessary for each lens group to be arranged on the optical axis when the photographing lens 31 is in a collapsed state. The thickness of the information device can be further reduced if the first and second lens groups are retracted from the optical axis to be housed in parallel with another lens group, for example.

As described above, the imaging lens descried in each of Embodiments 1-8 can be used as the photographing lens 31 in the information device having a camera device as a photographing section, and a small and high quality information device including a camera function with the light-receiving element 45 having over 5-10 million pixels can be achieved.

Hereinafter, embodiments of a zoom lens, imaging device and information device will be described with reference to the drawings.

Embodiments of the present invention will be described before describing specific embodiments. In this case, FIGS. 1, 5, 9, 13, 17, 21 and 25 correspond to the first to seventh embodiments, but can be also used as the following Embodiments 1-7.

A zoom lens according to the embodiment of the present invention includes in order from the object side to the image side a first lens group I having a positive refractive power, a second lens group II having a negative refractive power, a third lens group III having a negative refractive power, a fourth lens group IV having a positive refractive power, a fifth lens group V having a positive refractive power and an aperture stop S arranged between the third and fourth lens groups III, IV. All of the lens groups moves, the interval between the first and second lens groups I, II is increased, the interval between the second and third lens groups II, III is varied, the interval between the third and fourth lens groups III, IV is decreased, the interval between the fourth and fifth lens groups IV, V is decreased, and the aperture stop S moves together with the fourth lens group IV according to an embodiment when changing a magnification from a telephoto end to a wide-angle end.

The first lens group I includes in order from the object side to the image side a first lens L1 made of a negative meniscus lens having a convex surface on the object side and a second lens L2 made of a positive meniscus lens having a convex surface on the object side. These first and second lenses L1, L2 form a cemented lens in which the first and second lenses are bonded to each other.

The second lens group II includes a third lens L3 made of a negative meniscus lens having a convex surface on the object side, a fourth lens L4 made of a biconcave lens having an aspheric surface on both surfaces and a strong concave surface on the image side and a fifth lens L5 made of a biconvex lens having a strong convex surface on the object side.

The third lens group III includes a six lens L6 made of a negative meniscus lens having a convex surface on the image side.

The fourth lens group IV includes a seventh lens L7 made of a biconvex lens having an aspheric surface on both surfaces and a strong convex surface on the object side, an eighth lens L8 made of a biconvex lens having a strong convex surface on the image side and a ninth lens L9 made of a biconcave lens having a strong concave surface on the object side. The eighth and ninth lenses L8, L9 are bonded to form a cemented lens.

The fifth lens group IV includes a tenth lens L10 made of a biconvex lens having an aspheric surface on both surfaces and a strong convex surface on the object side and an eleventh lens L11 made of a negative meniscus lens having a convex surface on the object side.

The above zoom lens includes the following various features.

The following condition (7) is satisfied where a focal length of the third lens group is f3, a focal length of the entire system at the wide-angle end is fw, a focal length of the entire system at the telephoto end is ft and an intermediate focal length Fm of the focal length fw and the focal distance ft is Fm=√fw×ft.

$$1.4 < |f3/\sqrt{(fw \times ft)}| < 3 \tag{7}$$

The condition (7) expresses a ratio of the intermediate focal length and the focal length of the third lens group. If the parameter exceeds the upper limit value of 3, the displacement of the third lens group having a focusing function is increased in close photographing, so that the interval between the second and third lens groups has to be increased, resulting in the increase in the entire length of the optical system. If the parameter is below the lower limit value of 1.4, the focal length of the third lens group becomes too short, and the displacement from the infinity to the shortest photographing distance in the focusing is reduced. However, the sensitivity is increased, and an accurate positional accuracy of the third lens group is required, resulting in the complication of the mechanical constitution.

The following condition (8) is satisfied where the focal length of the first lens group is f1 and the focal length of the second lens group is f2.

$$2.2 < |f1/f2| < 3.5 \tag{8}$$

The condition (8) expresses a ratio of the focal lengths of the first and second lens groups. If the parameter exceeds the upper limit value of 3.5, the focal length of the second lens group becomes too short, so that deterioration in aberrations when changing a magnification is increased. Manufacturing error sensitivity is also increased, causing a problem in a production performance. If the parameter is below the lower limit value of 2.2, the focal length of the second lens group becomes too long, so that the displacement of the second lens group when changing a magnification is increased, resulting in the increase in the entire length of the optical system.

The following condition (9) is satisfied where the focal length of the first lens group is f1, the focal length of the entire system at the wide-angle end is fw, the focal length of the entire system at the telephoto end is ft, and the intermediate focal length of the focal length fw and the focal length ft is Fm=Fm=√fw×ft.

$$2.2 < |f1/\sqrt{(fw \times ft)}| < 3.5 \quad (9)$$

The condition (9) expresses a ratio of the focal length of the first lens group and the intermediate focal length. If the parameter exceeds the upper limit value of 3.5, the focal length of the first lens group becomes too long, so that the displacement of the first lens group when changing a magnification is increased, resulting in the increase in the entire length of the optical system.

The focal length of the first lens group becomes too short if the parameter is below the lower limit value of 2.2, and deterioration in aberrations when changing a magnification is increased. Manufacturing error sensitivity and a manufacturing cost are also increased, causing a problem in a production performance.

The following condition (10) is satisfied where the focal length of the second lens group is f2 and the focal length of the third lens group is f3.

$$0.2 < f2/f3 < 0.9 \quad (10)$$

The condition (10) expresses a ratio of the focal lengths of the second and third lens groups. If the parameter exceeds the upper limit value of 0.9, the displacement of the second lens group having a function for changing a magnification is increased when changing a magnification, so that the entire length of the optical system is increased. Deterioration in aberrations in focusing is also increased because the focal length of the third lens group of the focusing group becomes too short. If the parameter is below the lower limit value of 0.2, deterioration in aberrations when changing a magnification is increased because the focal length of the second lens group becomes too short. Manufacturing error sensitivity is also increased, causing a problem in a production performance. Moreover, the focal length of the third lens group of the focusing group becomes too long, so that the displacement for focusing is increased, resulting in the increase in the entire length of the optical system.

The following conditions (11), (12) are satisfied where an Abbe's number relative to d-line of the negative lens of the third lens group is νd3, and a partial dispersion ratio of the negative lens of the third lens group is θg, F=(ng−nF)/(nF−nC) where a refractive index relative to g-line is ng, a refractive index relative to F-line is nF, and a refractive index relative to c-line is nC.

$$\nu d3 > 50 \quad (11)$$

$$\theta g, F < 1.2 \times 10-3 \cdot \nu d3 + 0.62 \quad (12)$$

The condition (11) expresses an Abbe's number in d-line of the negative lens constituting the third lens group. The condition (12) expresses a partial dispersion ratio of the negative lens of the third lens group.

Figure 35:
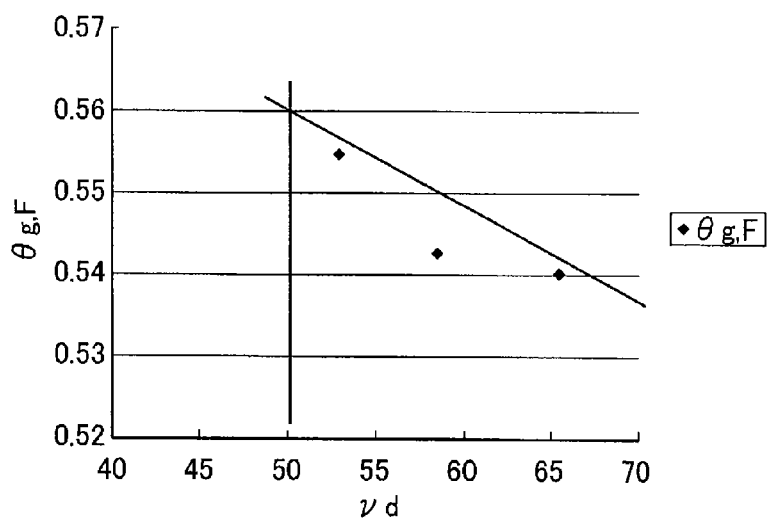
FIG. 35 is a graph illustrating a range prescribed by conditions (8), (9). In the graph, the horizontal axis is an Abbe's number (vd3) in d-line and the vertical axis is a partial dispersion ratio (θg, F).

FIG. 35 illustrates an area defined by the conditions (11), (12). In FIG. 35, the horizontal axis is νd and the vertical axis is θg, F. The deterioration in aberrations due to the focusing can be controlled by using a glass material within an area in which θg, F is in the lower side of the condition (12). A group having a negative power as a whole by combining a positive lens made of a glass material having large dispersion and a negative lens made of a glass material having small dispersion is generally used for a group having a negative power in order to control a chromatic aberration. However, even if the third lens group is constituted by one negative lens, a chromatic aberration can be preferably corrected over the entire zooming area, and the deterioration in aberrations due to the focusing can be controlled by using the glass material within the above range.

The third lens group having a focusing function is constituted by one negative lens. By satisfying the above conditions (7), (11), (12), a problem regarding the deterioration in aberrations due to the focusing can be solved even if the third lens group of the focusing group is constituted by one negative lens. With this constitution, the focusing group can be downsized and the AF speed can be increased.

In this zoom lens, the fourth lens group and the aperture stop move together when changing a magnification. Therefore, the number of components can be reduced and the lens barrel unit can be downsized because it is not necessary to additionally provide a driver for the aperture stop.

In this zoom lens, the fifth lens group includes at least one positive lens and one negative lens.

The above zoom lens can be used for an imaging device and an information device as an optical system for photographing. As illustrated in FIG. 1, in each embodiment, the parallel plate F disposed on the image side of the fifth lens group IV is constituted of transparent parallel plates equivalent to various filters such as an optical low pass filter or infrared cut filter, a cover glass (sealing glass) of a light receiving element such as a CCD sensor, or the like.

In addition, a reference number FP illustrates an imaging surface of the zoom lens.

EMBODIMENT

Hereinafter, eight specific embodiments will be described.

The meanings of marks in Embodiments are as follows.

f: focal length of entire system

F: F-number

ω: half-field angle (deg)

surface number: number of surface (lens surface, aperture stop surface, filter, light receiving surface) counted from object side R: curvature radius (paraxial curvature radius in aspheric surface)

D: surface interval

Nd: refractive index

νd: Abbe's number

K: conical constant of aspheric surface

A4: fourth order aspheric surface coefficient

A6: sixth order aspheric surface coefficient

A8: eighth order aspheric surface coefficient

A10: tenth order aspheric surface coefficient

A12: twelfth order aspheric surface coefficient

A14: fourteenth order aspheric surface coefficient

An aspheric surface shape is defined by the following known Equation 1 by using an inverse of a paraxial curvature radius (paraxial curvature), C, a height from an optical axis, H, and a conical constant and an aspheric coefficient of each order, K, where X is an aspheric surface amount in an optical axis direction.

$$X=CH^2/[1+\sqrt{\{1-(1+K)C^2H^2\}}]+A4 \cdot H^4+A6 \cdot H^6 A8 \cdot H^8+A10 \cdot H^{10}+A12 \cdot H^{12}+A14 \cdot H^{14}$$

The shape is specified by applying a paraxial curvature radius, a conical constant and aspheric surface coefficients.

Embodiment 1

Embodiment 1 is the zoom lens illustrated in FIG. 1.

| f = 16.146~53.852 | | F = 3.59~5.93 | ω = 42.8~14.5 | |
|---|---|---|---|---|
| SURFACE NUMBER | R | D | Nd | vd |
| 1 | 35.22784 | 1.30000 | 1.84666 | 23.7800 |
| 2 | 25.43981 | 5.58108 | 1.69680 | 55.5300 |
| 3 | 161.95730 | VARIABLE A | | |
| 4 | 66.68463 | 0.97007 | 2.00100 | 29.1300 |
| 5 | 10.93000 | 6.31830 | | |
| 6 | −29.18377 | 0.80000 | 1.69350 | 53.1800 |
| 7 | 26.19043 | 0.09955 | | |
| 8 | 25.80601 | 4.24896 | 1.84666 | 23.7800 |
| 9 | −27.63060 | VARIABLE B | | |
| 10 | −20.24167 | 0.80000 | 1.60300 | 65.4400 (S-PHM53) |
| 11 | −50.23484 | VARIABLE C | | |
| 12 | ∞ (APERTURE STOP) | 1.45001 | | |
| 13 | 15.31467 | 3.43574 | 1.51633 | 64.0600 |
| 14 | −38.17926 | 0.10000 | | |
| 15 | 21.44923 | 3.93180 | 1.53172 | 48.8400 |
| 16 | −17.87906 | 1.45000 | 1.83400 | 37.1600 |
| 17 | 19.58694 | VARIABLE D | | |
| 18 | 19.29863 | 4.94809 | 1.58913 | 61.1500 |
| 19 | −19.58674 | 0.23493 | | |
| 20 | 48.01352 | 0.80173 | 1.90366 | 31.3200 |
| 21 | 16.49362 | VARIABLE E | | |
| 22 | ∞ | 0.70000 | 1.53770 | 66.6000 |
| 23 | ∞ | 1.50000 | | |
| 24 | ∞ | 0.70000 | 1.50000 | 64.0000 |
| 25 | ∞ | | | |

The aspheric surface data is as follows.
Sixth Surface
K=0
A4=−1.12571E-05
A6=1.21899E-07
A8=2.76874E-09
A10=−4.5160E-11
A12=1.38009E-13
Seventh Surface
K=0
A4=−4.98762E-05
A6=3.02710E-07
A8=−1.83352E-09
A10=−4.9553E-12
Thirteenth Surface
K=0
A4=−2.23034E-05
A6=−3.30061E-08
A8=1.96596E-09
A10=−4.33079E-11
Fourteenth Surface
K=0
A4=−6.86789E-06
A6=1.59127E-07
A8=−8.05125E-10
A10=−2.46291E-11
Eighteenth Surface
K=−4.76959
A4=−2.06414E-06
A6=−1.71695E-07
A8=−2.33143E-09
A10=6.08643E-12
Nineteenth Surface
K=0.25043
A4=3.72591E-05
A6=−4.11291E-08
A8=−2.02648E-09
A10=3.86766E-12

In the above aspheric surface data, "E-n" denotes "10⁻ⁿ". This is the same as in the following embodiments.

The glass material of the lens of the third lens group is S-PHM53 manufactured by OHARA Co., Ltd.

vd and θg, F of S-PHM53 are as follows according to the published catalogue.

vd=65.44

θg, F=0.5401

The variable amount data is illustrated in Table 1.

TABLE 1

| FOCAL LENGTH | 16.146 | 29.487 | 53.852 |
|---|---|---|---|
| VARIABLE A | 0.43999 | 6.06511 | 16.38637 |
| VARIABLE B | 2.90306 | 3.44128 | 4.32097 |
| VARIABLE C | 17.67216 | 7.91475 | 2.59996 |
| VARIABLE D | 5.29575 | 2.75180 | 1.65000 |
| VARIABLE E | 27.52876 | 40.70828 | 54.51902 |

Figure 2:
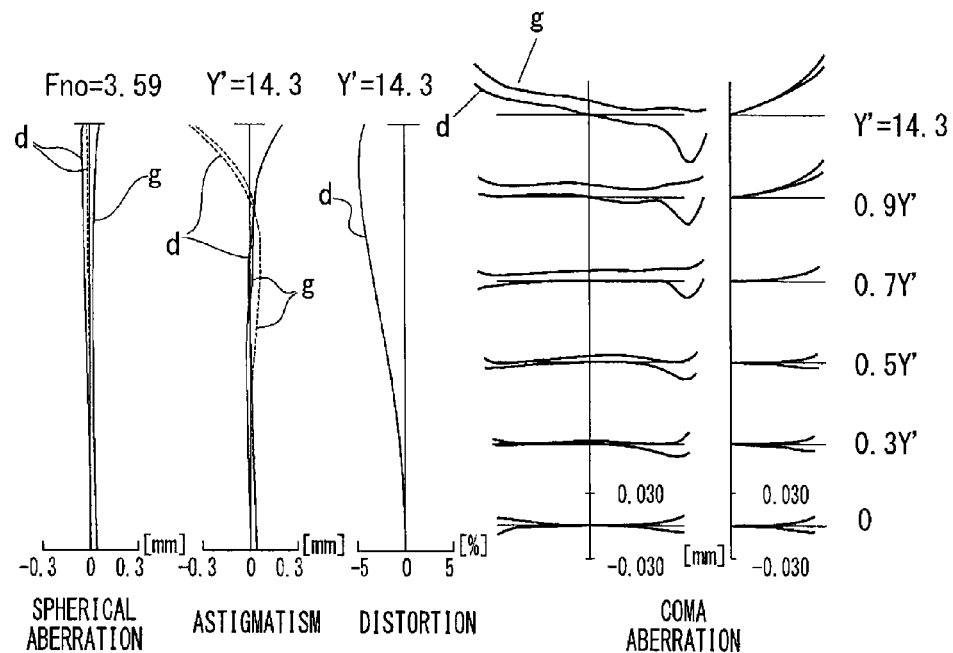
FIG. 2 shows aberration diagrams of the zoom lens in Embodiment 1 at the wide-angle end.
Figure 3:
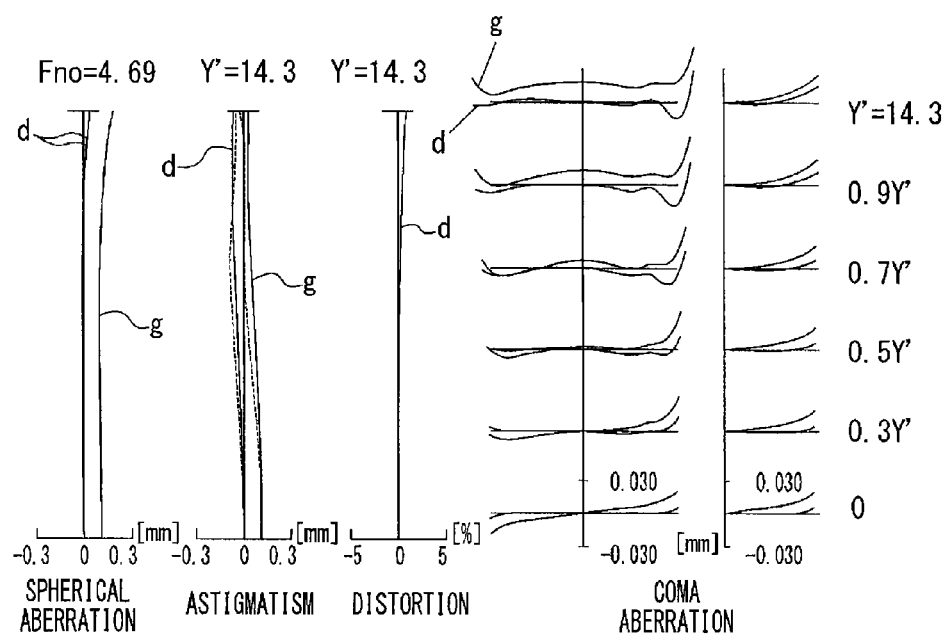
FIG. 3 shows aberration diagrams of the zoom lens in Embodiment 1 at the intermediate focal length.
Figure 4:
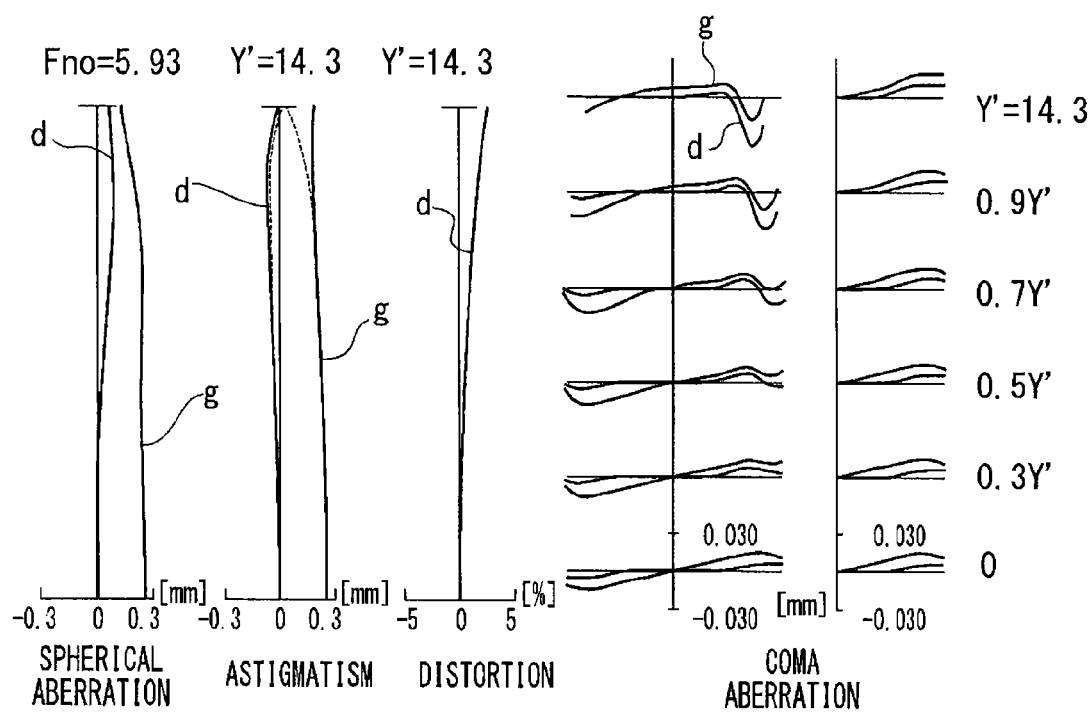
FIG. 4 shows aberration diagrams of the zoom lens in Embodiment 1 at the telephoto end.

FIGS. 2, 3, 4 are the aberration diagrams at the wide-angle end, intermediate focal length and telephoto end, respectively. The dashed line in the spherical aberration diagram illustrates a sine condition, the solid line in the astigmatism diagram illustrates a sagittal and the dashed line in the astigmatism diagram illustrates a meridional. In addition, "g" and "d" illustrate g-line and d-line, respectively. These are the same as the following other aberration diagrams.

Embodiment 2

FIG. 2 is the zoom lens illustrated in FIG. 5.

| | f = 16.146~53.851 | F = 3.6~5.77 | ω = 42.87~14.47 | |
|---|---|---|---|---|
| SURFACE NUMBER | R | D | Nd | νd |
| 1 | 43.11718 | 1.29999 | 1.84666 | 23.78 |
| 2 | 31.73933 | 5.57706 | 1.69680 | 55.53 |
| 3 | 190.09719 | VARIABLE A | | |
| 4 | 55.24695 | 0.97008 | 2.00100 | 29.13 |
| 5 | 10.53158 | 7.00758 | | |
| 6 | −37.69153 | 0.80000 | 1.69350 | 53.18 |
| 7 | 39.79764 | 0.12000 | | |
| 8 | 35.75261 | 4.22772 | 1.84666 | 23.78 |
| 9 | −27.02142 | VARIABLE B | | |
| 10 | −22.16816 | 0.80000 | 1.60300 | 65.44 (S-PHM53) |
| 11 | −68.86241 | VARIABLE C | | |
| 12 | ∞ (APERTURE STOP) | 1.45020 | | |
| 13 | 17.70983 | 4.99510 | 1.51633 | 64.06 |
| 14 | −25.76032 | 0.10000 | | |
| 15 | 24.82196 | 3.73181 | 1.53172 | 48.84 |
| 16 | −18.83887 | 1.44999 | 1.83400 | 37.16 |
| 17 | 19.93203 | VARIABLE D | | |
| 18 | 18.95445 | 5.30000 | 1.58913 | 61.15 |
| 19 | −22.79198 | 0.10000 | | |
| 20 | 46.10650 | 0.80000 | 1.90366 | 31.32 |
| 21 | 16.80062 | VARIABLE E | | |
| 22 | ∞ | 0.70000 | 1.53770 | 66.60 |
| 23 | ∞ | 1.50000 | | |
| 24 | ∞ | 0.70000 | 1.50000 | 64.00 |
| 25 | ∞ | | | |

The aspheric surface data is as follows.
Sixth Surface
K=0
A4=−6.13912E-05
A6=6.02764E-07
A8=−3.68927E-09
A10=−5.86282E-12
Seventh Surface
K=0
A4=−9.55771E-05
A6=6.67024E-07
A8=−5.78157E-09
A10=3.44512E-12
Thirteenth Surface
K=0
A4=−2.21195E-05
A6=−1.07672E-06
A8=1.98544E-08
A10=−3.47093E-10
Fourteenth Surface
K=0
A4=5.12674E-06
A6=−9.94310E-07
A8=1.53589E-08
A10=−2.78900E-10
Eighteenth Surface
K=−1.2879
A4=−1.57778E-05
A6=−7.80973E-08
A8=−8.69905E-10
A10=3.89552E-12
Nineteenth Surface
K=0.98584
A4=4.43195E-05
A6=5.66872E-08
A8=−2.64609E-09
A10=1.33387E-11

The glass material of the lens of the third lens group is S-PHM53 manufactured by OHARA Co., Ltd.

νd and θg, F of S-PHM53 are as follows according to the published catalogue.

νd=65.44

θg, F=0.5401

The variable amount data is illustrated in Table 2.

TABLE 2

| FOCAL LENGTH | 16.14596 | 29.48643 | 53.85135 |
|---|---|---|---|
| VARIABLE A | 0.44012 | 8.55784 | 22.14102 |
| VARIABLE B | 3.74070 | 3.93725 | 4.34529 |
| VARIABLE C | 18.45697 | 8.08099 | 2.59987 |
| VARIABLE D | 5.92655 | 3.05743 | 1.65001 |
| VARIABLE E | 28.29985 | 41.24833 | 54.53266 |

Figure 6:
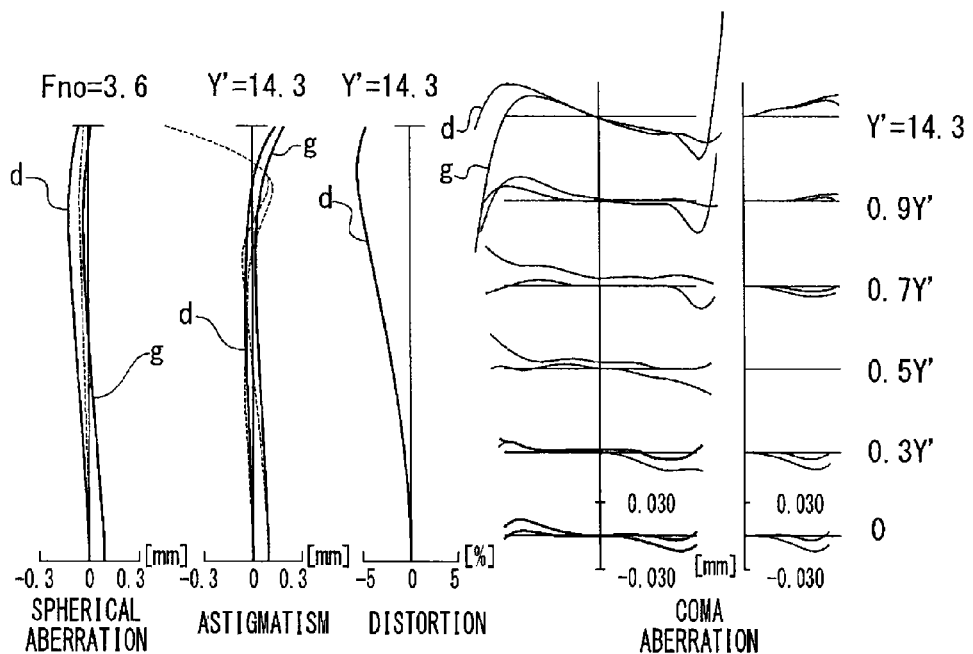
FIG. 6 shows aberration diagrams of the zoom lens in Embodiment 2 at the wide-angle end.
Figure 7:
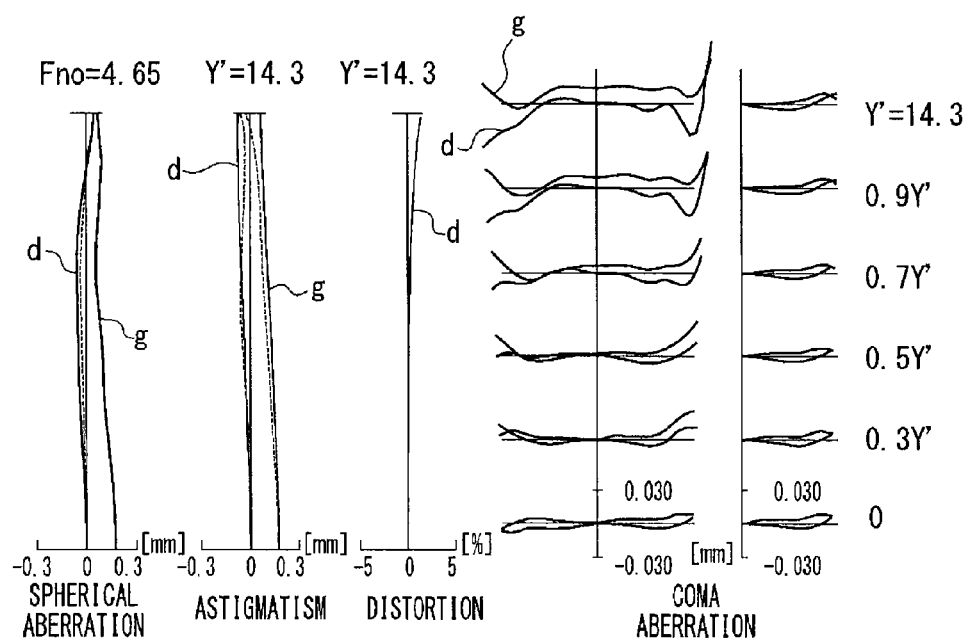
FIG. 7 shows aberration diagrams of the zoom lens in Embodiment 2 at the intermediate focal length.
Figure 8:
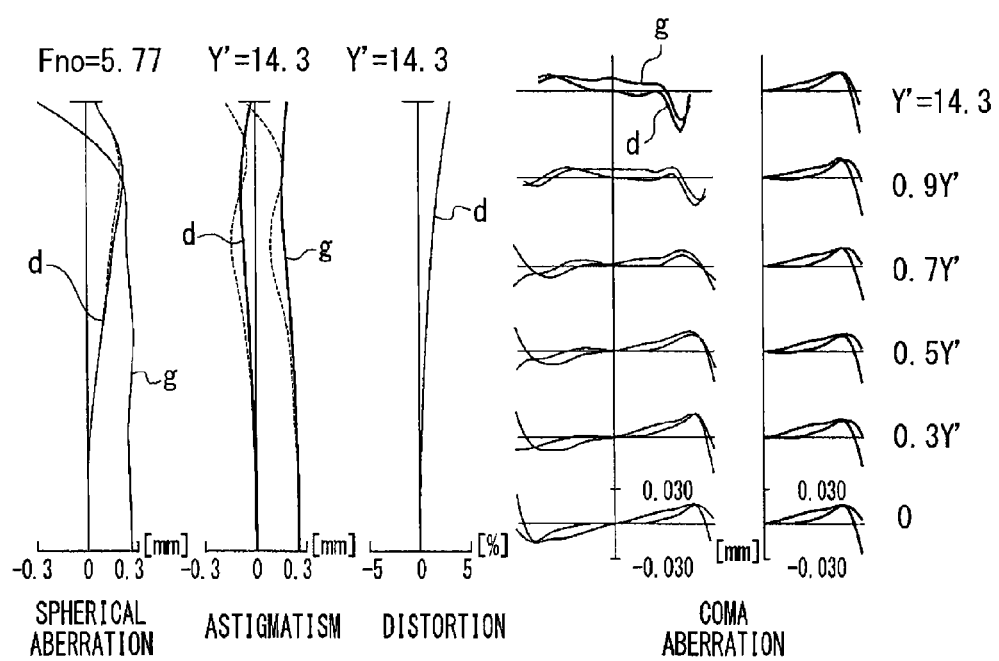
FIG. 8 shows aberration diagrams of the zoom lens in Embodiment 2 at the telephoto end.

FIGS. 6, 7, 8 are the aberration diagrams at the wide-angle end, intermediate distance, telephoto end in Embodiment 2, respectively.

Embodiment 3

Embodiment 3 is the zoom lens illustrated in FIG. 9

| | f = 16.146~53.85 | F = 3.62~5.67 | ω = 42.8~14.46 | |
|---|---|---|---|---|
| SURFACE NUMBER | R | D | Nd | νd |
| 1 | 44.83622 | 1.30000 | 1.84666 | 23.78 |
| 2 | 30.32788 | 5.80250 | 1.77250 | 49.60 |
| 3 | 152.20233 | VARIABLE A | | |
| 4 | 55.56877 | 0.97009 | 2.00100 | 29.13 |
| 5 | 10.85110 | 6.67902 | | |
| 6 | −40.92454 | 0.80000 | 1.77703 | 47.4 (LLAH87) |
| 7 | 36.32245 | 0.65885 | | |
| 8 | 30.89732 | 4.44422 | 1.84666 | 23.78 |
| 9 | −26.99833 | VARIABLE B | | |
| 10 | −24.45877 | 0.80000 | 1.64850 | 53.02 (S-BSM71) |
| 11 | −103.58339 | VARIABLE C | | |
| 12 | ∞ (APERTURE STOP) | 1.45008 | | |
| 13 | 16.52481 | 5.35383 | 1.51633 | 64.06 |
| 14 | −25.99633 | 0.10000 | | |
| 15 | 23.78029 | 3.61747 | 1.51742 | 52.43 |
| 16 | −22.01894 | 1.45000 | 1.83400 | 37.16 |
| 17 | 17.55937 | VARIABLE D | | |
| 18 | 19.88520 | 5.30000 | 1.58913 | 61.15 |
| 19 | −22.74438 | 0.10000 | | |
| 20 | 53.58387 | 0.80000 | 1.90366 | 31.32 |
| 21 | 18.67841 | VARIABLE E | | |
| 22 | ∞ | 0.70000 | 1.53770 | 66.60 |
| 23 | ∞ | 1.50000 | | |
| 24 | ∞ | 0.70000 | 1.50000 | 64.00 |
| 25 | ∞ | | | |

The aspheric surface data is as follows.

Sixth Surface
K=0
A4=−8.18151E-06
A6=−2.01833E-07
A8=2.53333E-09
A10=−1.29107E-11

Seventh Surface
K=0
A4=−3.23283E-05
A6=−1.88341E-07
A8=1.96755E-09
A10=−1.43273E-11

Thirteenth Surface
K=0
A4=−3.22004E-05
A6=−9.60992E-07
A8=1.55589E-08
A10=−2.82657E-10

Fourteenth Surface
K=0
A4=3.53815E-06
A6=−8.66214E-07
A8=1.17377E-08
A10=−2.24402E-10

Eighteenth Surface
K=−1.27337
A4=−1.58768E-05
A6=−1.86624E-07
A8=6.94712E-10
A10=−5.97184E-12

Nineteenth Surface
K=0
A4=3.31640E-05
A6=−1.06067E-07
A8=−6.29723E-10
A10=0

The glass material of the lens of the third lens group is S-BSM71 manufactured by OHARA Co., Ltd.

νd and θg, F of S-BSM71 are as follows according to the published catalogue.

νd=53.02

θg, F=0.5547

The variable amount data is illustrated in Table 3.

TABLE 3

| FOCAL LENGTH | 16.15 | 29.49 | 53.85 |
|---|---|---|---|
| VARIABLE A | 0.44000 | 8.87257 | 22.67111 |
| VARIABLE B | 2.87666 | 3.12901 | 4.33617 |
| VARIABLE C | 19.29016 | 8.43762 | 2.59994 |
| VARIABLE D | 6.18178 | 3.32394 | 1.65001 |
| VARIABLE E | 27.38221 | 39.66109 | 51.81615 |

Figure 10:
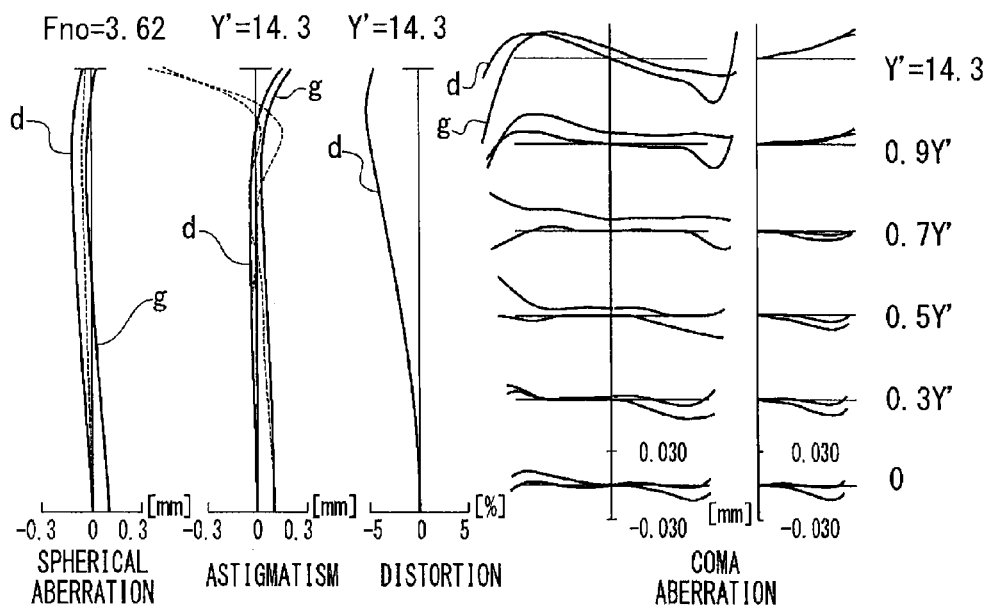
FIG. 10 shows aberration diagrams of the zoom lens in Embodiment 3 at the wide-angle end.
Figure 11:
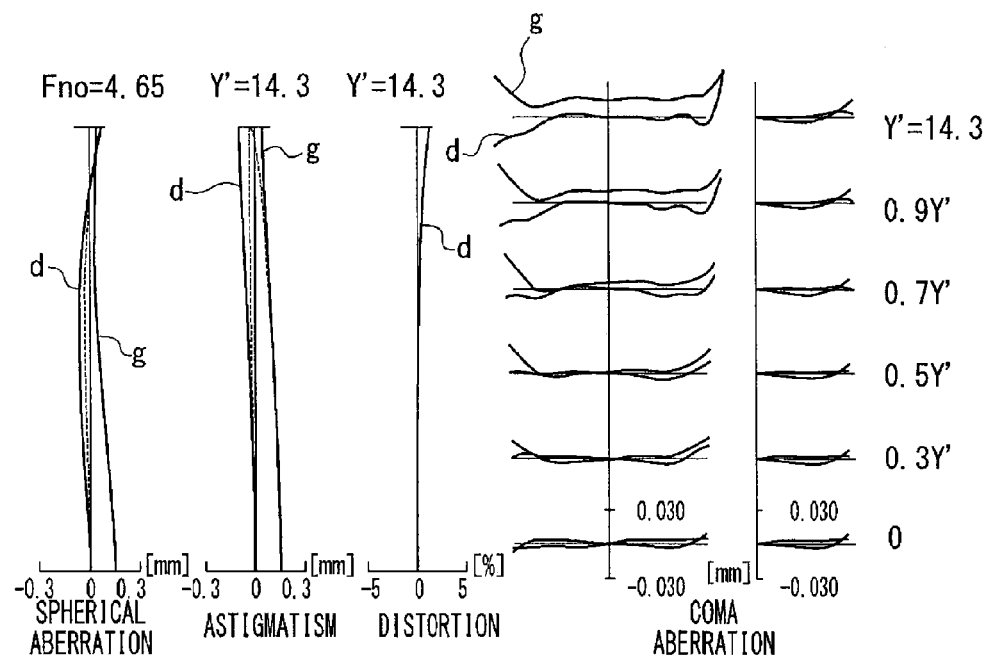
FIG. 11 shows aberration diagrams of the zoom lens in Embodiment 3 at the intermediate focal length.
Figure 12:
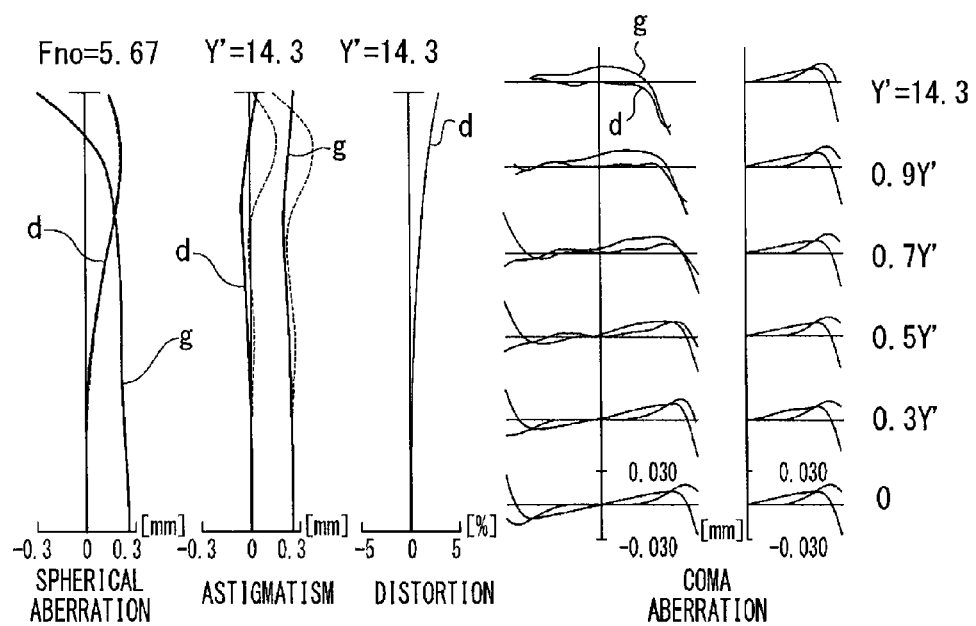
FIG. 12 shows aberration diagrams of the zoom lens in Embodiment 3 at the telephoto end.

FIGS. 10, 11, 12 are the aberration diagrams at the wide-angle end, intermediate distance, telephoto end in Embodiment 3, respectively.

Embodiment 4

Embodiment 4 is a zoom lens illustrated in FIG. 13.

| | f = 16.19450~45.75015 | F = 3.62882~5.85754 | | |
|---|---|---|---|---|
| | ω = 42.69841~16.94375 | | | |
| SURFACE NUMBER | R | D | Nd | vd |
| 1 | 33.04630 | 1.30000 | 1.84666 | 23.78 |
| 2 | 24.61909 | 5.03061 | 1.69680 | 55.53 |
| 3 | 136.08670 | VARIABLE A | | |
| 4 | 66.82379 | 0.97000 | 2.00100 | 29.13 |
| 5 | 10.13620 | 6.58248 | | |
| 6 | −27.08140 | 0.80000 | 1.69350 | 53.18 |
| 7 | 42.28382 | 0.10000 | | |
| 8 | 36.12687 | 4.06747 | 1.84666 | 23.78 |
| 9 | −23.91703 | VARIABLE B | | |
| 10 | −19.22723 | 0.80000 | 1.60300 | 65.44 (S-PHM53) |
| 11 | −40.79376 | VARIABLE C | | |
| 12 | ∞ (APERTURE STOP) | 1.45000 | | |
| 13 | 15.53437 | 3.73586 | 1.51633 | 64.06 |
| 14 | −28.31772 | 0.10000 | | |
| 15 | 26.51545 | 3.96987 | 1.53172 | 48.84 |
| 16 | −16.08335 | 1.45000 | 1.83400 | 37.16 |
| 17 | 21.49926 | VARIABLE D | | |
| 18 | 18.61811 | 5.28649 | 1.58913 | 61.15 |
| 19 | −19.32644 | 0.10000 | | |
| 20 | 50.34422 | 0.82401 | 1.90366 | 31.32 |
| 21 | 15.67976 | VARIABLE E | | |
| 22 | ∞ | 0.70000 | 1.53770 | 66.60 |
| 23 | ∞ | 1.50000 | | |
| 24 | ∞ | 0.70000 | 1.50000 | 64.00 |
| 25 | ∞ | | | |

The aspheric surface data is as follows
Sixth Surface
K=0
A4=−2.62797E-05
A6=2.15039E-07
A8=1.25881E-09
A10=−3.37339E-11
A12=−5.96466E-14
Seventh Surface
K=0
A4=−6.94415E-05
A6=2.98647E-07
A8=−1.81245E-09
A10=−2.26671E-11
Thirteenth Surface
K=0
A4=−1.84404E-05
A6=−9.86481E-08
A8=1.21421E-09
A10=−2.38227E-11
Fourteenth Surface
K=0
A4=9.50545E-06
A6=8.22895E-08
A8=−9.41319E-10
A10=−1.57178E-11
A12=0
Eighteenth Surface
K=−4.00213
A4=5.35275E-06
A6=−6.14576E-08
A8=−3.35757E-09
A10=3.63892E-11
Nineteenth Surface
K=−0.0203
A4=4.11207E-05
A6=6.45731E-08
A8=−4.12993E-09
A10=4.1149E-11

The glass material of the lens of the third lens group is S-BSM53 manufactured by OHARA Co., Ltd.

vd and θg, F of S-BSM53 are as follows according to the published catalogue.

vd=65.44

θg, F=0.5401

The variable amount data is illustrated in Table 4.

TABLE 4

| FOCAL LENGTH | 16.19450 | 27.22021 | 45.75015 |
|---|---|---|---|
| VARIABLE A | 0.44000 | 3.12474 | 13.64650 |
| VARIABLE B | 2.92021 | 3.87145 | 4.13333 |
| VARIABLE C | 16.99152 | 7.10888 | 2.60000 |
| VARIABLE D | 5.50038 | 2.77435 | 1.65000 |
| VARIABLE E | 26.57554 | 38.89238 | 48.19625 |

Figure 14:
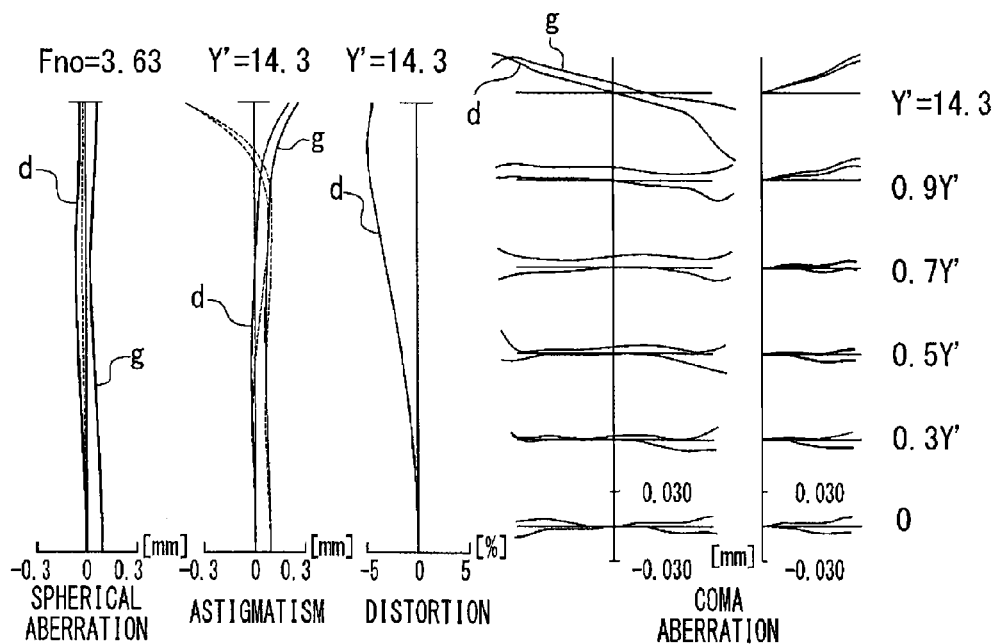
FIG. 14 shows aberration diagrams of the zoom lens in Embodiment 4 at the wide-angle end.
Figure 15:
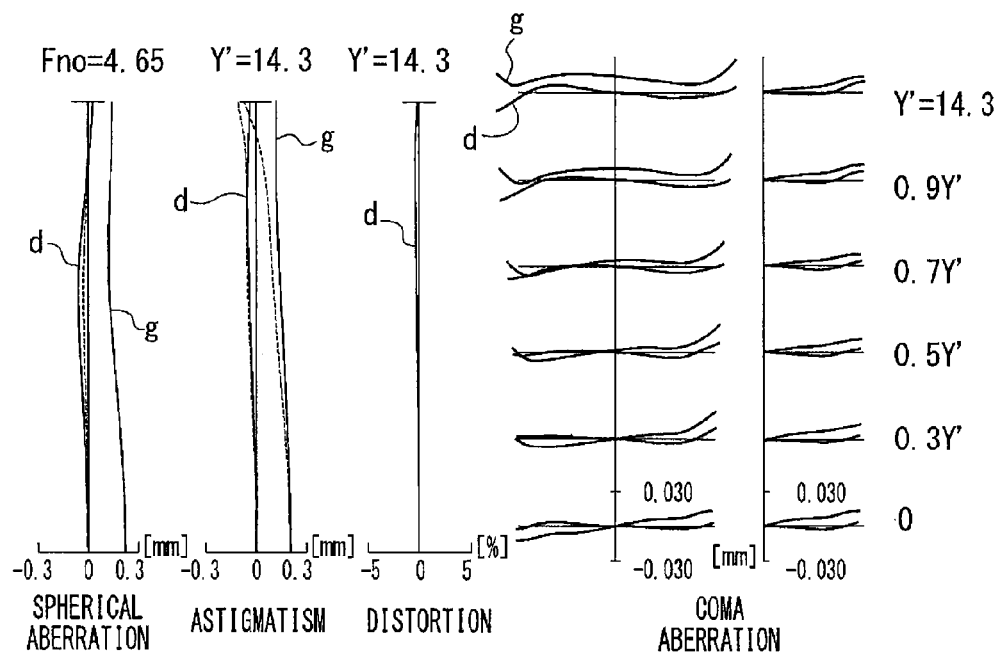
FIG. 15 shows aberration diagrams of the zoom lens in Embodiment 4 at the intermediate focal length.
Figure 16:
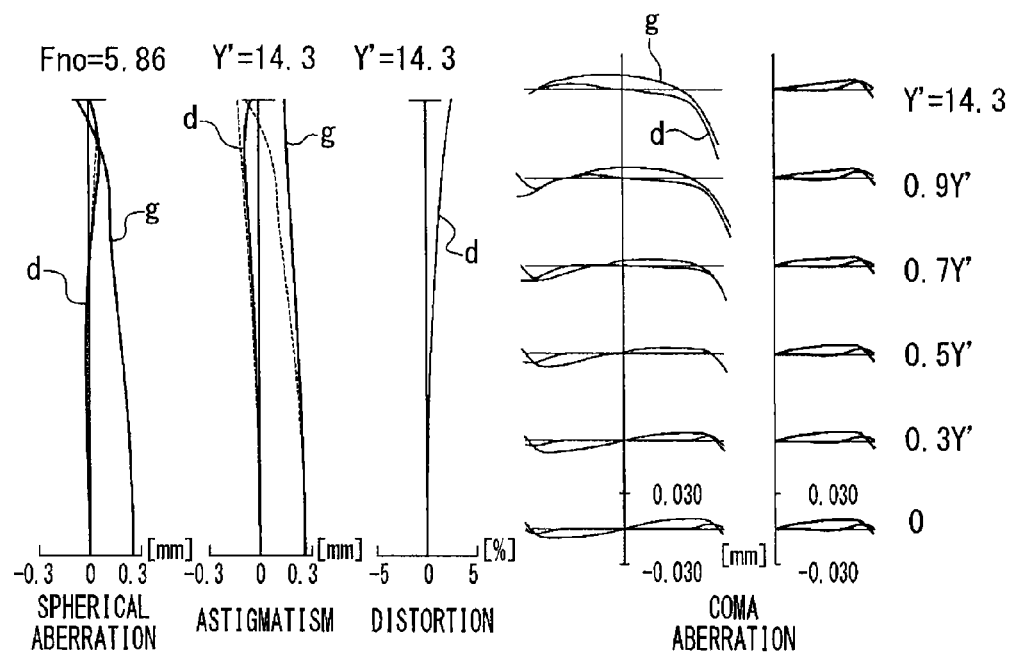
FIG. 16 shows aberration diagrams of the zoom lens in Embodiment 4 at the telephoto end.

FIGS. 14, 15, 16 are the aberration diagrams at the wide-angle end, intermediate distance, telephoto end in Embodiment 4, respectively.

Embodiment 5

Embodiment 5 is a zoom lens illustrated in FIG. 17.

| | f = 16.146~53.84 | F = 3.65~5.74 | ω = 41.5~14.87 | |
|---|---|---|---|---|
| SURFACE NUMBER | R | D | Nd | νd |
| 1 | 46.03179 | 1.30005 | 1.84666 | 23.78 |
| 2 | 31.22940 | 5.51888 | 1.77250 | 49.60 |
| 3 | 152.04501 | VARIABLE A | | |
| 4 | 51.07120 | 0.97002 | 2.00100 | 29.13 |
| 5 | 10.77721 | 6.63709 | | |
| 6 | −42.16678 | 0.79999 | 1.77030 | 47.40 |
| 7 | 38.75553 | 0.96368 | | |
| 8 | 30.38725 | 4.33203 | 1.84666 | 23.78 |
| 9 | −29.02408 | VARIABLE B | | |
| 10 | −21.91807 | 0.80000 | 1.64850 | 53.02 (S-BSM71) |
| 11 | −79.56447 | VARIABLE C | | |
| 12 | ∞ (APERTURE STOP) | 1.44994 | | |
| 13 | 18.62497 | 4.02774 | 1.51633 | 64.06 |
| 14 | −25.81393 | 0.09995 | | |
| 15 | 20.81187 | 4.01271 | 1.51742 | 52.43 |
| 16 | −19.74213 | 1.44999 | 1.83400 | 37.16 |
| 17 | 19.22015 | VARIABLE D | | |
| 18 | 20.95766 | 5.30002 | 1.58913 | 61.15 |
| 19 | −22.01066 | 0.10001 | | |
| 20 | 42.36060 | 0.79999 | 1.90366 | 31.32 |
| 21 | 16.44550 | VARIABLE E | | |
| 22 | ∞ | 0.70000 | 1.53770 | 66.60 |
| 23 | ∞ | 1.50000 | | |
| 24 | ∞ | 0.70000 | 1.50000 | 64.00 |
| 25 | ∞ | | | |

The aspheric surface data is as follows
Sixth Surface
K=0
A4=5.52979E−05
A6=−1.46723E−06
A8=1.40955E−08
A10=−5.75258E−11
Seventh Surface
K=0
A4=3.02092E−05
A6=−1.53901E−06
A8=1.44769E−08
A10=−6.26901E−11
Thirteenth Surface
K=0
A4=−8.40542E−06
A6=−4.37152E−07
A8=1.03740E−08
A10=−2.45238E−10
Fourteenth Surface
K=0
A4=2.47361E−05
A6=−6.21729E−07
A8=1.37690E−08
A10=−2.72842E−10
Eighteenth Surface
K=−0.92674
A4=−1.83059E−05
A6=−3.30349E−08
A8=−2.28321E−09
A10=−6.15846E−13
Nineteenth Surface
K=0
A4=3.19375E−05
A6=3.31577E−08
A8=−2.88956E−09
A10=0

The glass material of the lens of the third lens group is S-BSM71 manufactured by OHARA Co., Ltd.

νd and θg, F of S-BSM71 are as follows according to the published catalogue.

νd=53.02

θg, F=0.5547

The variable amount data is illustrated in Table 5.

TABLE 5

| FOCAL LENGTH | 16.14591 | 29.48378 | 53.84341 |
|---|---|---|---|
| VARIABLE A | 0.47981 | 8.94913 | 23.54063 |
| VARIABLE B | 3.46925 | 3.31521 | 4.34035 |
| VARIABLE C | 18.75306 | 8.22939 | 2.59987 |
| VARIABLE D | 6.13180 | 2.96958 | 1.64988 |
| VARIABLE E | 27.35054 | 39.92413 | 52.30469 |

Figure 18:
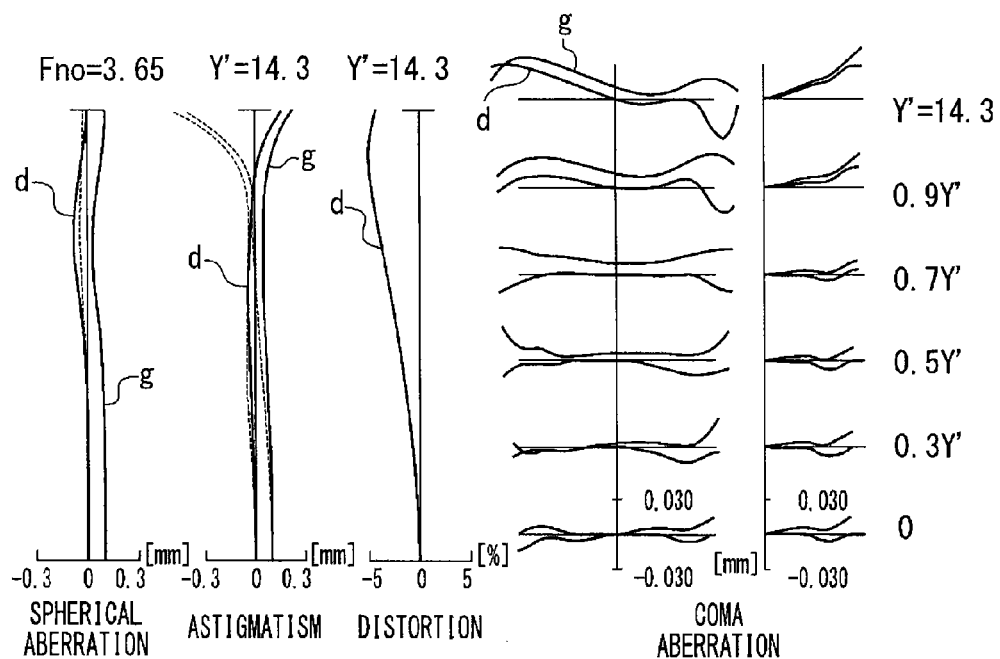
FIG. 18 shows aberration diagrams of the zoom lens in Embodiment 5 at the wide-angle end.
Figure 19:
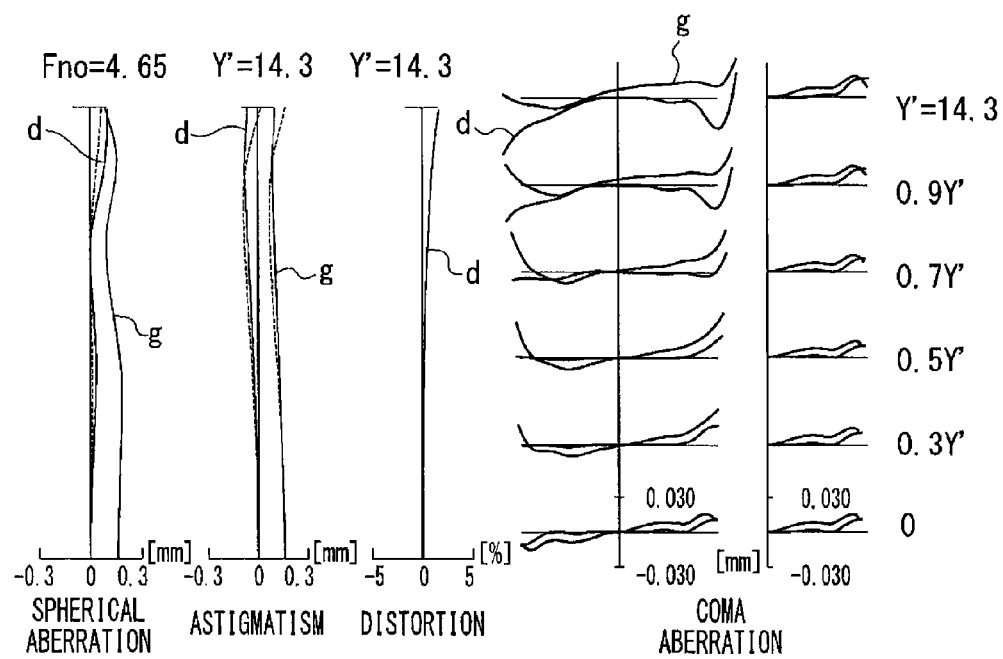
FIG. 19 shows aberration diagrams of the zoom lens in Embodiment 5 at the intermediate focal length.
Figure 20:
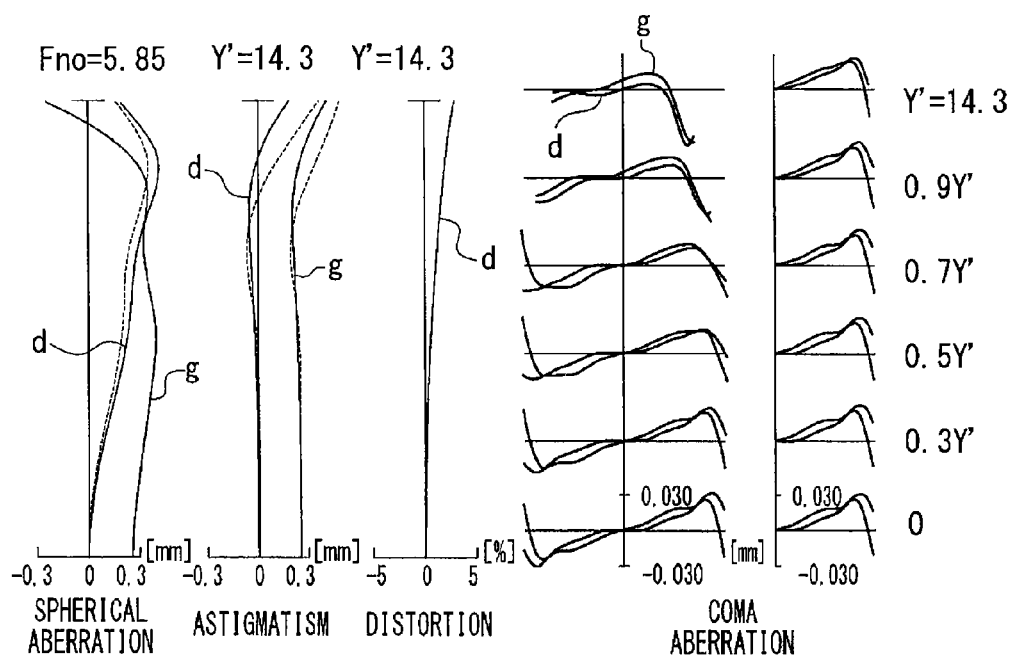
FIG. 20 shows aberration diagrams of the zoom lens in Embodiment 5 at the telephoto end.

FIGS. 18, 19, 20 are the aberration diagrams at the wide-angle end, intermediate distance, telephoto end in Embodiment 5, respectively.

Embodiment 6

Embodiment 6 is a zoom lens illustrated in FIG. 21.

| | f = 16.146~53.852 | F = 3.62~5.77 | ω = 41.53~14.87 | |
|---|---|---|---|---|
| SURFACE NUMBER | R | D | Nd | vd |
| 1 | 52.97005 | 1.31000 | 1.84666 | 23.78 |
| 2 | 35.71101 | 5.48584 | 1.77250 | 49.60 |
| 3 | 189.65170 | VARIABLE A | | |
| 4 | 57.34337 | 0.95497 | 2.00100 | 29.13 |
| 5 | 11.09490 | 6.36289 | | |
| 6 | −52.53144 | 0.80001 | 1.77030 | 47.40 |
| 7 | 36.40322 | 1.16039 | | |
| 8 | 30.42534 | 4.23829 | 1.84666 | 23.78 |
| 9 | −30.42507 | VARIABLE B | | |
| 10 | −22.85191 | 0.80000 | 1.64850 | 53.02 (S-BSM71) |
| 11 | −92.38759 | VARIABLE C | | |
| 12 | ∞ (APERTURE STOP) | 1.40001 | | |
| 13 | 19.49107 | 3.32058 | 1.51633 | 64.06 |
| 14 | −25.78639 | 0.11538 | | |
| 15 | 18.99577 | 4.01733 | 1.51742 | 52.43 |
| 16 | −18.99577 | 1.40000 | 1.83400 | 37.16 |
| 17 | 18.99577 | VARIABLE D | | |
| 18 | 19.38104 | 5.59999 | 1.58913 | 61.15 |
| 19 | −23.21203 | 0.10000 | | |
| 20 | 34.69037 | 0.80000 | 1.90366 | 31.32 |
| 21 | 14.67162 | VARIABLE E | | |
| 22 | ∞ | 0.70000 | 1.53770 | 66.60 |
| 23 | ∞ | 1.50000 | | |
| 24 | ∞ | 0.70000 | 1.50000 | 64.00 |
| 25 | ∞ | | | |

The aspheric surface data is as follows.
Sixth Surface
K=0
A4=2.63554E-05
A6=−1.09237E-06
A8=9.8447E-09
A10=−3.41409E-11
Seventh Surface
K=0
A4=2.93738E-06
A6=−1.13624E-06
A8=1.01043E-08
A10=−3.88306E-11
Thirteenth Surface
K=0
A4=3.21402E-07
A6=−1.03872E-07
A8=6.34622E-09
A10=−1.99948E-10
Fourteenth Surface
K=0
A4=2.47699E-05
A6=−2.4115E-07
A8=9.50458E-09
A10=−2.36136E-10
Eighteenth Surface
K=−0.57855
A4=−1.83484E-05
A6=−2.90044E-08
A8=−1.90061E-09
A10=−5.50054E-12
Nineteenth Surface
K=−0.09961
A4=3.54974E-05
A6=3.43435E-08
A8=−3.14805E-09

The glass material of the lens of the third lens group is S-BSM71 manufactured by OHARA Co., Ltd.

vd and θg, F of S-BSM71 are as follows according to the published catalogue.

vd=53.02

θg, F=0.5547

The variable amount data is illustrated in Table 6.

TABLE 6

| FOCAL LENGTH | 16.14575 | 29.48616 | 53.85229 |
|---|---|---|---|
| VARIABLE A | 1.00003 | 10.71413 | 26.85616 |
| VARIABLE B | 3.49515 | 3.27157 | 4.27495 |
| VARIABLE C | 18.58004 | 8.07056 | 2.49995 |
| VARIABLE D | 26.45879 | 3.30413 | 1.64995 |
| VARIABLE E | 26.45879 | 38.93855 | 51.55163 |

Figure 22:
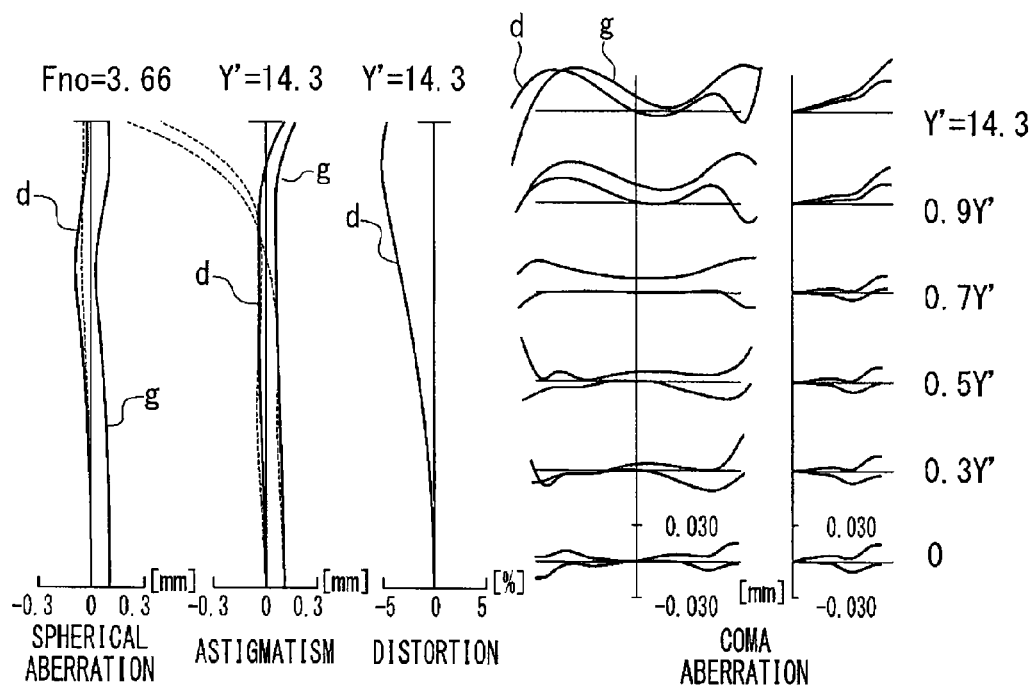
FIG. 22 shows aberration diagrams of the zoom lens in Embodiment 6 at the wide-angle end.
Figure 23:
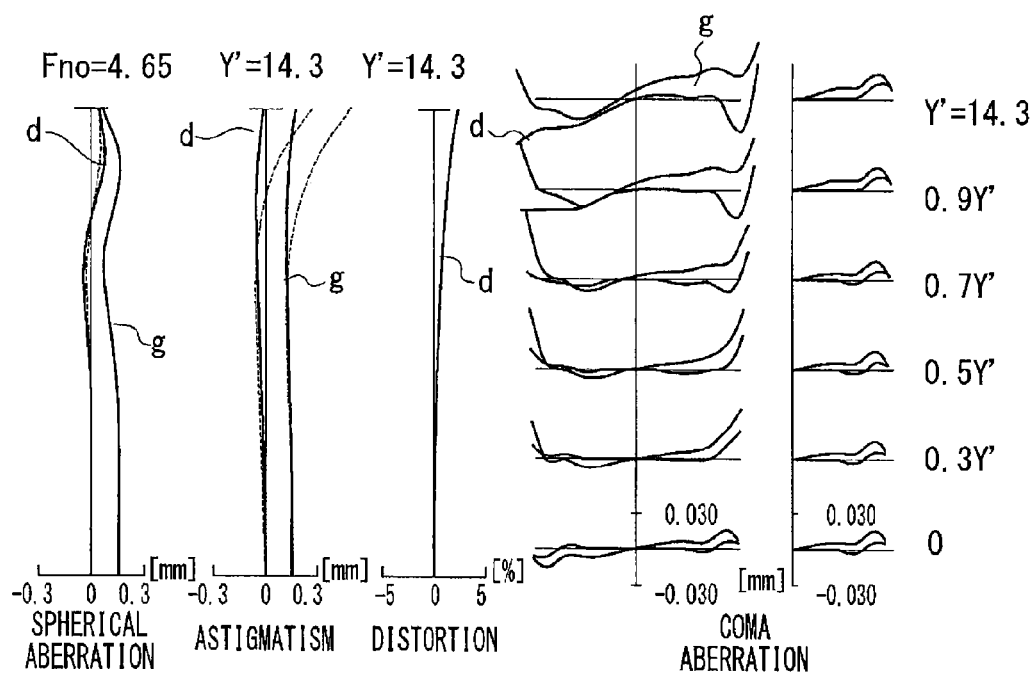
FIG. 23 shows aberration diagrams of the zoom lens in Embodiment 6 at the intermediate focal length.
Figure 24:
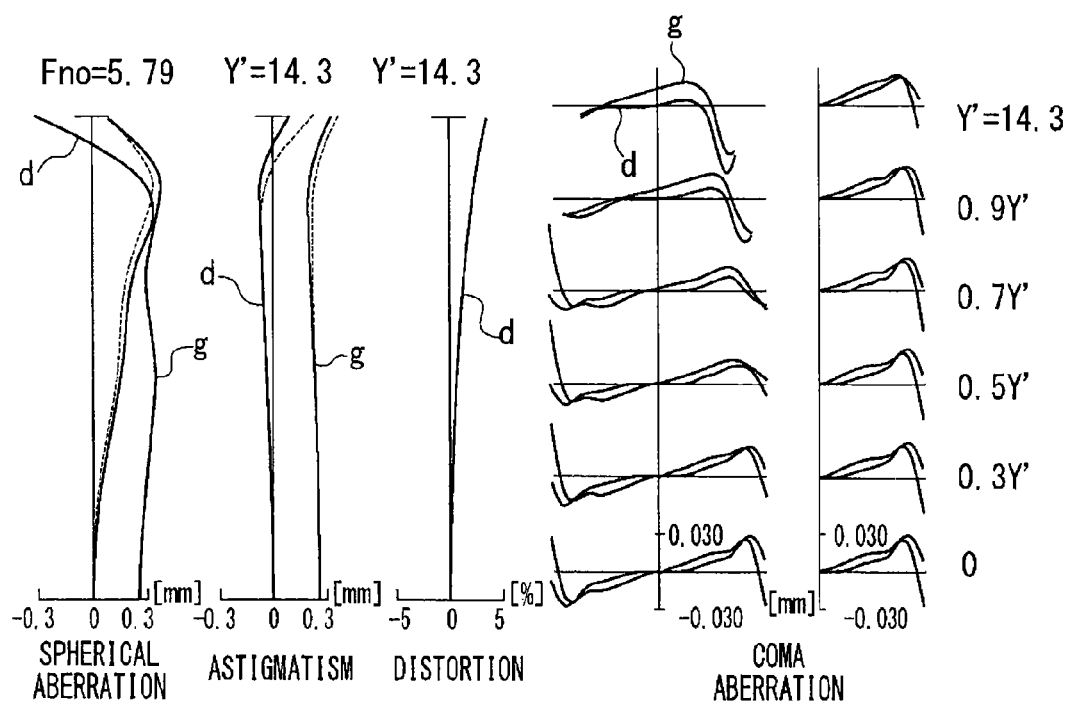
FIG. 24 shows aberration diagrams of the zoom lens in Embodiment 6 at the telephoto end.

FIGS. 22, 23, 24 are the aberration diagrams at the wide-angle end, intermediate distance, telephoto end in Embodiment 6, respectively.

Embodiment 7

Embodiment 7 is a zoom lens illustrated in FIG. 25.

| | f = 16.146~53.852 | F = 3.61~5.76 | ω = 41.53~14.87 | |
|---|---|---|---|---|
| SURFACE NUMBER | R | D | Nd | vd |
| 1 | 53.02258 | 1.31000 | 1.84666 | 23.78 |
| 2 | 35.94362 | 5.46329 | 1.77250 | 49.60 |
| 3 | 188.67998 | VARIABLE A | | |
| 4 | 54.87412 | 0.95512 | 2.00100 | 29.13 |
| 5 | 10.79646 | 6.44587 | | |
| 6 | −51.91885 | 0.80000 | 1.74320 | 49.29 |
| 7 | 40.63394 | 1.06371 | | |
| 8 | 31.38598 | 4.08243 | 1.84666 | 23.78 |
| 9 | −31.38598 | VARIABLE B | | |
| 10 | −23.00149 | 0.80000 | 1.65160 | 58.55 (S-LAL7) |
| 11 | −97.40089 | VARIABLE C | | |
| 12 | ∞ (APERTURE STOP) | 1.39999 | | |
| 13 | 19.57334 | 3.29549 | 1.51633 | 64.06 |
| 14 | −25.26589 | 0.10000 | | |
| 15 | 19.46405 | 3.89071 | 1.51742 | 52.43 |
| 16 | −19.46405 | 1.40519 | 1.83400 | 37.16 |
| 17 | 19.46405 | VARIABLE D | | |
| 18 | 19.69818 | 5.60000 | 1.58913 | 61.15 |
| 19 | −22.10614 | 0.10000 | | |
| 20 | 38.97349 | 0.80019 | 1.90366 | 31.32 |
| 21 | 15.14672 | VARIABLE E | | |
| 22 | ∞ | 0.70000 | 1.53770 | 66.60 |
| 23 | ∞ | 1.50000 | | |
| 24 | ∞ | 0.70000 | 1.50000 | 64.00 |
| 25 | ∞ | | | |

The aspheric surface data is as follows.
Sixth Surface
K=0
A4=3.46877E-05
A6=−1.27443E-06
A8=1.11921E-08
A10=−4.40045E-11
Seventh Surface
K=0
A4=6.8617E-06
A6=−1.34447E-06
A8=1.13537E-08
A10=−4.81564E-11
Thirteenth Surface
K=0
A4=−1.2513E-06
A6=−4.84014E-08
A8=5.40686E-09
A10=−2.0620E-10
Fourteenth Surface
K=0
A4=2.71708E-05
A6=−2.3373E-07
A8=9.93932E-09
A10=−2.54318E-10
Eighteenth Surface
K=−0.65075
A4=−1.90482E-05
A6=−3.34777E-08
A8=−1.71693E-09
A10=−5.56274E-12
Nineteenth Surface
K=−0.20854
A4=3.63343E-05
A6=2.45318E-08
A8=−2.95008E-09

The glass material of the lens of the third lens group is S-LAL7 manufactured by OHARA Co., Ltd.
vd and θg, F of S-LAL7 are as follows according to the published catalogue.
vd=58.55
θg, F=0.5425
The variable amount data is illustrated in Table 7.

TABLE 7

| FOCAL LENGTH | 16.14586 | 29.48668 | 53.85211 |
|---|---|---|---|
| VARIABLE A | 1.00003 | 10.81399 | 27.00555 |
| VARIABLE B | 3.56892 | 3.23901 | 4.21342 |
| VARIABLE C | 18.19944 | 7.95884 | 2.50002 |
| VARIABLE D | 7.23212 | 3.33550 | 1.65001 |
| VARIABLE E | 26.76503 | 39.32439 | 52.06792 |

Figure 26:
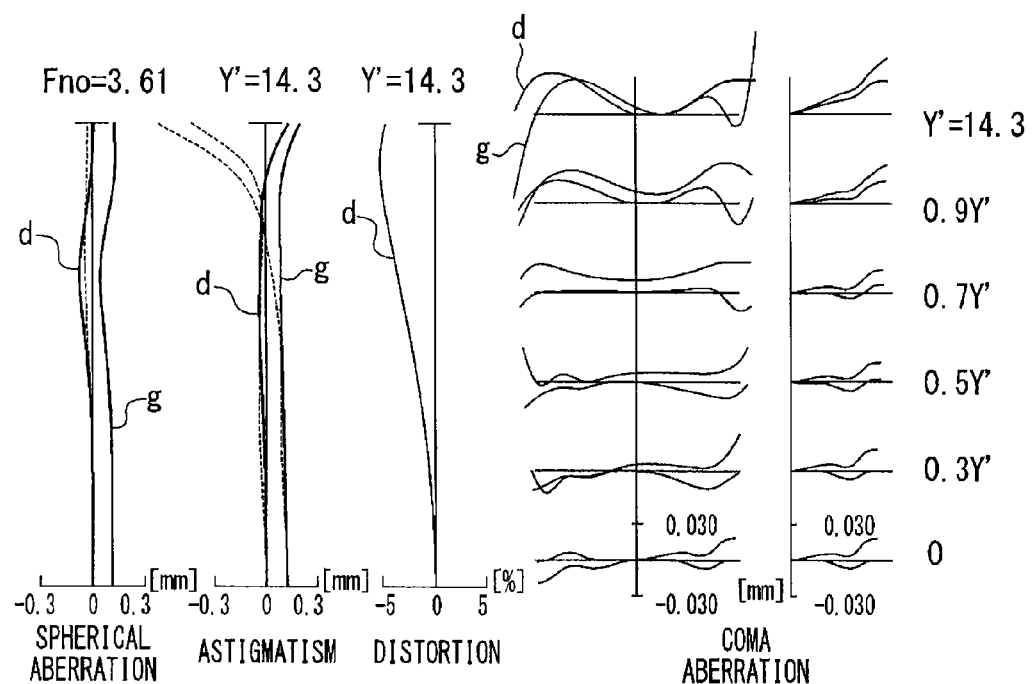
FIG. 26 shows aberration diagrams of the zoom lens in Embodiment 7 at the wide-angle end.
Figure 27:
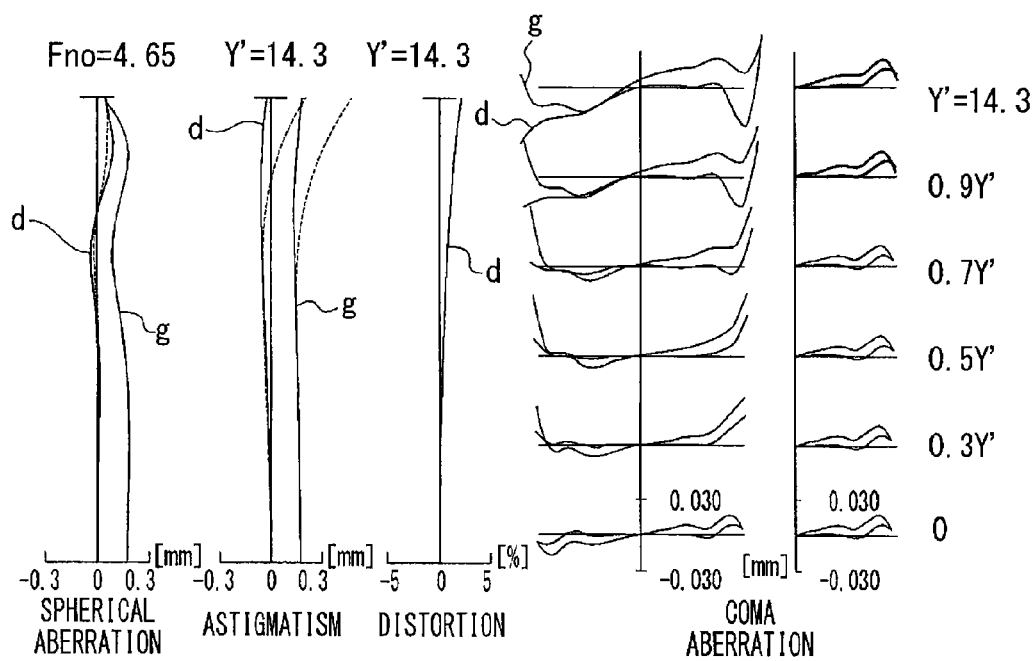
FIG. 27 shows aberration diagrams of the zoom lens in Embodiment 7 at the intermediate focal length.
Figure 28:
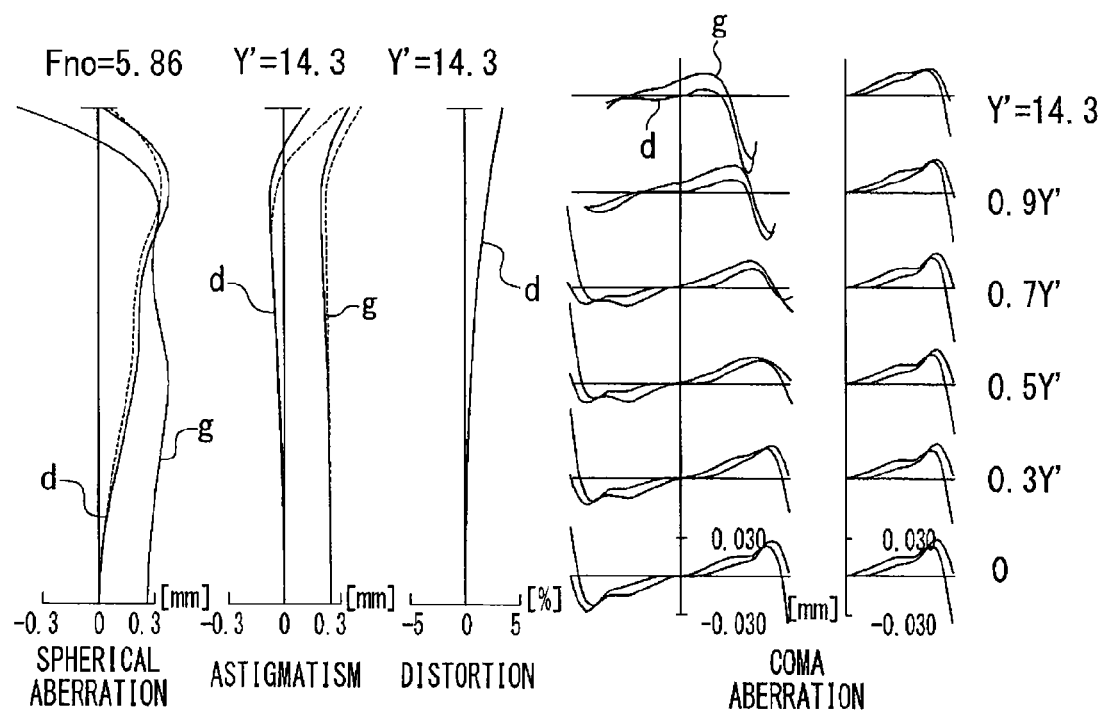
FIG. 28 shows aberration diagrams of the zoom lens in Embodiment 7 at the telephoto end.

FIGS. 26, 27, 28 are the aberration diagrams at the wide-angle end, intermediate distance, telephoto end in Embodiment 7, respectively.

Embodiment 8

Embodiment 8 is a zoom lens illustrated in FIG. 29.

| | f = 16.145~53.86 | F = 3.64~5.75 | ω = 41.53~15.0 | |
|---|---|---|---|---|
| SURFACE NUMBER | R | D | Nd | vd |
| 1 | 51.57017 | 1.35033 | 1.84666 | 23.78 |
| 2 | 35.08789 | 5.69112 | 1.7725 | 49.6 |
| 3 | 182.91872 | VARIABLE A | | |
| 4 | 44.57654 | 0.98972 | 2.001 | 29.13 |
| 5 | 10.55643 | 6.75921 | | |
| 6 | −44.69477 | 0.80002 | 1.7432 | 49.29 |
| 7 | 47.5051 | 1.35366 | | |

-continued

| | f = 16.145~53.86 | | F = 3.64~5.75 | ω = 41.53~15.0 | |
|---|---|---|---|---|---|
| SURFACE NUMBER | R | D | Nd | νd | |
| 8 | 32.75877 | 3.82977 | 1.84666 | 23.78 | |
| 9 | −32.75877 | VARIABLE B | | | |
| 10 | −24.76086 | 0.8 | 1.6516 | 58.55 | (S-LAL7) |
| 11 | −153.4119 | VARIABLE C | | | |
| 12 | ∞ | 1.40078 | | | |
| 13 | 18.96748 | 3.75245 | 1.51633 | 64.06 | |
| 14 | −24.25341 | 0.09999 | | | |
| 15 | 18.77954 | 4.04255 | 1.51742 | 52.43 | |
| 16 | −18.77954 | 1.3999 | 1.834 | 37.16 | |
| 17 | 18.77954 | VARIABLE D | | | |
| 18 | 22.71409 | 5.00033 | 1.58913 | 61.15 | |
| 19 | −20.0266 | 0.10002 | | | |
| 20 | 56.47649 | 0.79994 | 1.90366 | 31.32 | |
| 21 | 17.45296 | VARIABLE E | | | |
| 22 | ∞ | 0.70000 | 1.53770 | 66.60 | |
| 23 | ∞ | 1.50000 | | | |
| 24 | ∞ | 0.70000 | 1.50000 | 64.00 | |
| 25 | ∞ | | | | |

The aspheric surface data is as follows.
Sixth Surface
K=0.000000E+00
A4=2.855640E-05
A6=−1.210950E-06
A8=1.113490E-08
A10=−5.459440E-11
Seventh Surface
K=0.000000E+00
A4=1.969800E-06
A6=−1.114090E-06
A8=8.666190E-09
A10=−3.951870E-11
Thirteenth Surface
K=0.000000E+00
A4=−4.439230E-06
A6=−9.177670E-08
A8=4.021770E-09
A10=−1.681980E-10
Fourteenth Surface
K=0.000000E+00
A4=2.834640E-05
A6=−2.280050E-07
A8=6.993710E-09
A10=−2.005280E-10
Eighteenth Surface
K=−4.551530E-01
A4=−2.952530E-05
A6=2.344050E-08
A8=−4.179360E-09
A10=2.547520E-12
Nineteenth Surface
K=−6.679000E-01
A4=2.331810E-05
A6=4.120810E-08
A8=−4.205110E-09

The glass material of the lens of the third lens group is S-LAL7 manufactured by OHARA Co., Ltd.

νd and θg, F of S-LAL7 are as follows according to the published catalogue.

νd=58.55

θg, F=0.5425

The variable amount data is illustrated in Table 8.

TABLE 8

| FOCAL LENGTH | 16.15 | 29.48 | 53.86 |
|---|---|---|---|
| VARIABLE A | 0.50072 | 10.08202 | 26.42607 |
| VARIABLE B | 3.48321 | 3.16098 | 4.17288 |
| VARIABLE C | 17.98655 | 7.89556 | 2.50075 |
| VARIABLE D | 5.94076 | 2.88738 | 1.65198 |
| VARIABLE E | 26.7382 | 39.32604 | 51.63359 |

Figure 30:
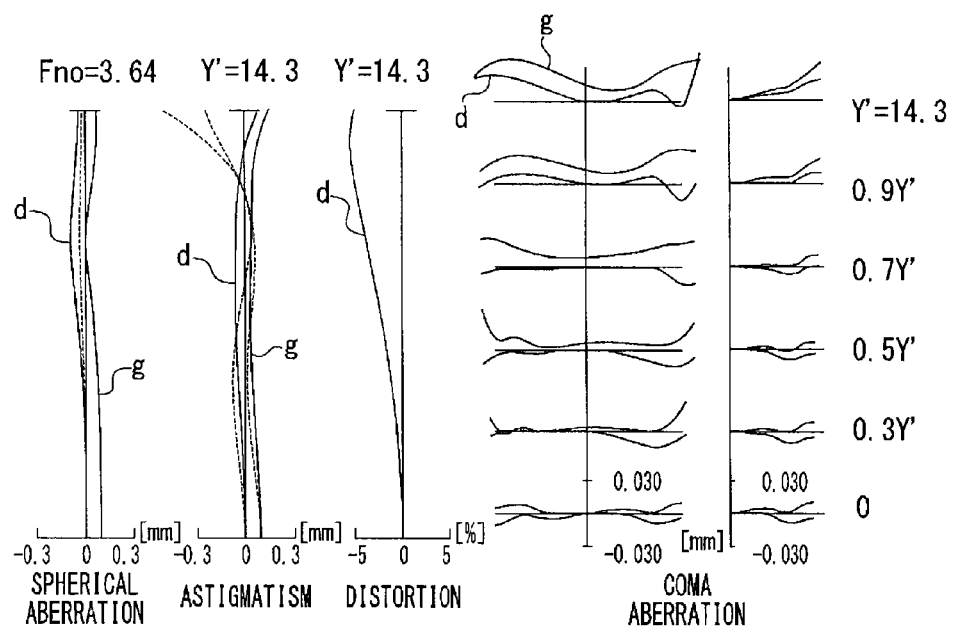
FIG. 30 shows aberration diagrams of the zoom lens in Embodiment 8 at the wide-angle end.
Figure 31:
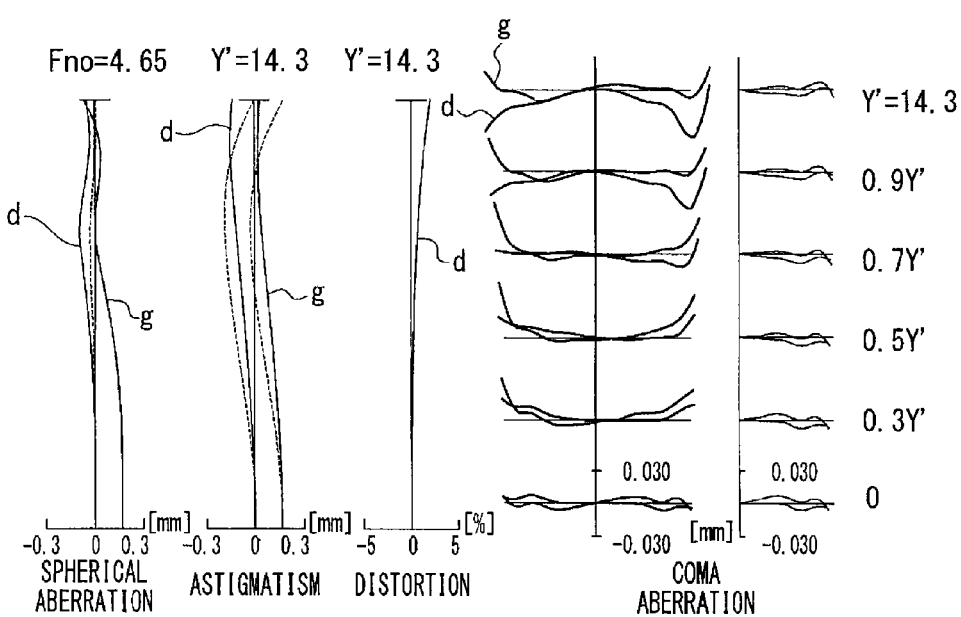
FIG. 31 shows aberration diagrams of the zoom lens in Embodiment 8 at the intermediate focal length.
Figure 32:
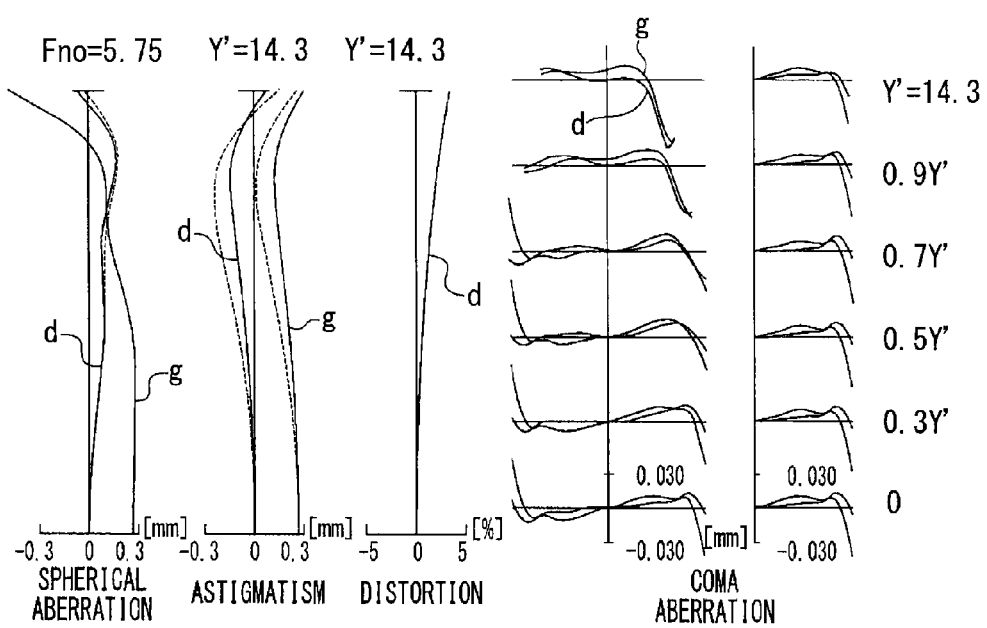
FIG. 32 shows aberration diagrams of the zoom lens in Embodiment 8 at the telephoto end.

FIGS. 30, 31, 32 are the aberration diagrams at the wide-angle end, intermediate distance, telephoto end in Embodiment 8, respectively.

The parameter values of conditions in respective embodiments are illustrated in Table 9.

TABLE 9

| | EMBODI-MENT 1 | EMBODI-MENT 2 | EMBODI-MENT 3 | EMBODI-MENT 4 | EMBODI-MENT 5 | EMBODI-MENT 6 | EMBODI-MENT 7 | EMBODI-MENT 8 |
|---|---|---|---|---|---|---|---|---|
| CONDITION (1) | 2.39 | 3.40 | 5.60 | 1.67 | 4.11 | 4.82 | 5.23 | 9.17 |
| CONDITION (2) | 2.43 | 3.42 | 5.67 | 1.69 | 4.15 | 4.86 | 5.26 | 9.22 |
| CONDITION (3) | 1.93 | 1.85 | 1.68 | 2.25 | 1.59 | 1.6 | 1.57 | 1.54 |
| CONDITION (4) | 65.44 | 65.44 | 53.02 | 65.44 | 53.02 | 53.02 | 58.55 | 58.55 |
| CONDITION (5) | 0.89 | 0.89 | 0.89 | 0.88 | 0.89 | 0.89 | 0.89 | 0.89 |
| CONDITION (6) | 3.34 | 3.34 | 3.34 | 2.83 | 3.33 | 3.34 | 3.34 | 3.34 |

As illustrated in FIG. 9, Embodiments 1-8 satisfy the conditions (1)-(6).

The aberration is preferably corrected and a preferable performance is obtained in each embodiment.

In the zoom lens in each of Embodiments 1-7, the parameter values of the above conditions (7)-(12) are within the ranges of the conditions, respectively.

Figure 36:
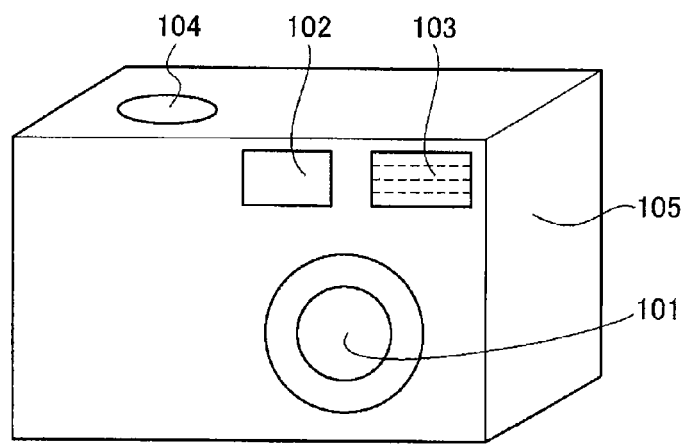
FIG. 36 is a perspective view schematically illustrating an external constitution of a digital camera as an imaging device according to an embodiment of the present invention as seen from a subject side.
Figure 37:
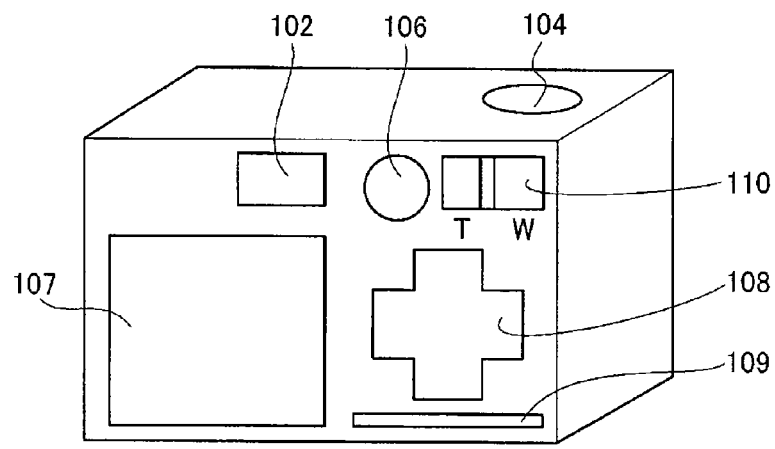
FIG. 37 is a perspective view schematically illustrating an external appearance of the digital camera in FIG. 36 as seen from a photographer's side.

Next, an embodiment of a digital camera as an imaging device in which the zoom lens according to each of the above Embodiments 1-7 is adopted as an optical system for photographing will be described with reference to FIGS. 34-37. FIG. 36 is a perspective view schematically illustrating an external appearance of a digital camera as seen from the front side, which is the object side, namely, the subject side. FIG. 37 is a perspective view schematically illustrating the external appearance of the digital camera as seen from the back side, which is the photographer's side. FIG. 34 is a block diagram schematically illustrating the functional constitution of the digital camera. In addition, the imaging device is described with an example of a digital camera. However, the zoom lens of the present invention can be applied to a silver salt film camera using a silver salt film as a conventional image-recording medium. An information device, for example, a portable digital assistant (PDA) or a cell phone having a camera function is widely used. Such an information device differs in an external appearance, but has functions and constitutions substantially similar to those in a digital camera. The zoom lens of the present invention can be applied to such an information device as an optical system for photographing.

As illustrated in FIGS. 36, 37, the digital camera includes a photographing lens 101, optical finder 102, strobe (flash light) 103, shutter button 104, camera body 105, power source switch 106, liquid crystal monitor 107, operation button 108, memory card socket 109 and zoom switch 110. As illustrated in FIG. 34, the digital camera includes a central processing unit (CPU) 111, image processor 112, light-receiving element 113, signal processor 114, semiconductor memory 115 and communication card 116.

The digital camera includes the photographing lens 101 as an optical system for photographing and the light-receiving element 113 constituted as an image sensor using a CMOS (complementary metal-oxide semiconductor) or CCD (charged coupled device), and is configured to read a subject optical image formed by the photographing lens 101 with the light-receiving element 113. The zoom lens described in each of Embodiments 1-7 is used as the photographing lens 101.

The output of the light-receiving element 113 is processed by the signal processor 114 which is controlled by the central processing unit 111, and is converted into digital image information. Such a digital camera includes a unit which converts an image (subject image) into digital image information. This unit is constituted by the light-receiving element 113, signal processor 114, central processing unit (CPU) 111 which controls these, and the like.

After a predetermined image process is applied to the image information digitized by the signal processor 114 in the image processor 112 which is controlled by the central processing unit 111, the image information is recorded in the semiconductor memory 115 such as a non-volatile memory. In this case, the semiconductor memory 115 can be a memory card provided in the memory card socket 109, or can be a semiconductor memory built in a camera body (on-board). The liquid crystal monitor 107 can display an image in photographing or can display an image recorded in the semiconductor memory 115. The image recorded in the semiconductor memory 115 can be sent outside through, for example, a communication card 116 provided in a not shown communication socket.

The object surface of the photographing lens 101 is covered by a not shown lens barrier when a camera is carried. If a user turns on the power by the operation of the power source switch 106, the lens barrier opens and the object surface is exposed. In this case, the optical system of each group constituting the zoom lens in the lens barrel of the photographing lens 101 is arranged at the short focal point end (wide-angle end), for example. By operating the zoom switch 110, the arrangement of the optical system of each group is changed, and a magnification can be changed to the long focal point end (telephoto end) through the intermediate focal length. In addition, it is preferable for the optical system of the optical finder 102 to change a magnification in accordance with the change in the field angle of the photographing lens 101.

In many cases, the focusing is performed by the half-pressing operation of the shutter button 104. The focusing lens in the zoom lens illustrated in each of Embodiments 1-7 can be operated by the movement of a part of the lens groups constituting the zoom lens or the movement of the light-receiving element. The photographing is performed by the full-pressing operation of the shutter button 104. After that, the above described processes are conducted.

When displaying an image recorded in the semiconductor memory 115 on the liquid crystal monitor 107, or sending the image outside via the communication card 116 or the like, the operation button 108 is operated as defined. The semiconductor memory 115, communication card 116 and the like are provided in dedicated or general-purposed sockets such as the memory card socket 109 and communication card socket.

The photographing lens 101 constituted by using the zoom lens illustrated in each of Embodiments 1-7 can be used in the above-described digital camera (imaging device) or information device as an optical system for photographing. Accordingly, a small and high quality digital camera (imaging device) or information device using a light-receiving element having 10-15 million pixels can be accomplished.

Such a zoom lens can be applied to a zoom photographing lens of a silver salt camera or a projection lens of a projector.

As described above, a small zoom lens having a compact focusing group, small displacement in focusing and a high AF speed can be achieved by the above constitution.

Moreover, a zoom lens having a half-field angle at the wide-angle end of 36.8° or more, a magnification ratio of about 2.8 to 5 times, well-corrected aberrations and a resolution corresponding to a small and high resolution imaging element can be achieved as described in the above embodiments.

By providing such a zoom lens, a small and high performance imaging device can be achieved.

According to the embodiments of the present invention, a zoom lens having a compact focusing lens group, small displacement of the focusing lens group, reduced power for movement, well corrected aberrations and a light-receiving element having over 10 million pixels can be provided.

An imaging device and information device having a photographing function such as a compact and high performance digital camera can be also provided by using such a zoom lens.

Although the embodiments of the present invention have been described above, the present invention is not limited thereto. It should be appreciated that variations may be made in the embodiments described by persons skilled in the art without departing from the scope of the present invention.

What is claimed is:

1. A zoom lens comprising, in order from an object side in an optical axis:
    a first lens group having a positive refractive power;
    a second lens group having a negative refractive power;
    a third lens group having a negative refractive power;
    a fourth lens group having a positive refractive power;
    a fifth lens group having a positive refractive power; and
    an aperture stop arranged between the third lens group and the fourth lens group,
    an interval between the first lens group and the second lens group being increased, an interval between the second lens group and the third lens group being increased, an interval between the third lens group and the fourth lens group being decreased, and an interval between the fourth lens group and the fifth lens group being decreased when changing a magnification from a wide-angle end to a telephoto end,
    the third lens group including one negative lens made of a negative meniscus lens having a concave surface on the object side, and
    focusing being performed by moving the third lens group in an optical axis direction, wherein
    a curvature radius of an object side surface of the third lens group, R31, a curvature radius of an image side surface of the third lens group, R32, a focal length of the third lens group, F3, a synthesis focal length of the second and third lens groups at the wide-angle end, F23w, a synthesis focal length of the second and third lens groups at the telephoto end, F23t, a focal length at the wide-angle end, Fw, a focal length at the telephoto end, Ft, and √(Fw×Ft), Fm satisfy the following conditions (1), (2), (3):

$$1.0 < (R31-R32)/|F23w| < 10.0 \quad (1)$$

$$1.0 < (R31-R32)/|F23t| < 10.0 \quad (2)$$

$$1.4 < |F3|/Fm < 2.5 \quad (3).$$

2. The zoom lens according to claim 1, wherein a maximum image height, Y' and the focal length at the wide-angle end, Fw satisfy the following condition (5):

$$0.75 < Y'/Fw \quad (5).$$

3. The zoom lens according to claim 1, wherein the focal length at the telephoto end, Ft and the focal length of the wide-angle end, Fw satisfy the following condition (6):

$$2.8 < Ft/Fw \quad (6).$$

4. The zoom lens according to claim 1, wherein an Abbe's number of a material of one negative lens constituting the third lens group, νd satisfies the following condition (4):

$$\nu d > 50 \quad (4).$$

5. An information device including a photographing function comprising the zoom lens according to claim 1 as an optical system for photographing.

6. The information device according to claim 5, wherein an object image by the zoom lens is formed on a light-receiving surface of an imaging element.

7. The information device according to claim 6 comprising a portable digital assistant.

\* \* \* \* \*